(12) United States Patent
Chang et al.

(10) Patent No.: US 12,704,697 B2
(45) Date of Patent: Aug. 11, 2026

(54) LENS ASSEMBLY

(71) Applicants: Sintai Optical (Shenzhen) Co., Ltd., ShenZhen City (CN); Asia Optical Co., Inc., Taichung (TW)

(72) Inventors: Hsi-Ling Chang, Taichung (TW); Guo-Yang Wu, Taichung (TW); Chien-Hung Chen, Taichung (TW); Ming-Huang Tseng, Taichung (TW)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 732 days.

(21) Appl. No.: 17/879,924

(22) Filed: Aug. 3, 2022

(65) Prior Publication Data

US 2023/0108477 A1 Apr. 6, 2023

(30) Foreign Application Priority Data

Sep. 28, 2021 (TW) ................................ 110136021

(51) Int. Cl.
*G02B 9/34* (2006.01)
*G02B 13/00* (2006.01)

(52) U.S. Cl.
CPC ............. *G02B 13/004* (2013.01); *G02B 9/34* (2013.01)

(58) Field of Classification Search
CPC ........ G02B 13/004; G02B 9/34; G02B 13/00; G02B 15/14
See application file for complete search history.

(56) References Cited

U.S. PATENT DOCUMENTS 9,658,432 B2 5/2017 Chae
2019/0072745 A1* 3/2019 Chen ........................ G02B 9/60
2019/0179112 A1* 6/2019 Chen ........................ G02B 9/34
2020/0241240 A1* 7/2020 Chen .................. G02B 13/0045
2020/0301108 A1 9/2020 Syu
2021/0278633 A1* 9/2021 Tseng ....................... G02B 9/34
2023/0213782 A1* 7/2023 Son ......................... G02B 7/08 359/557
2024/0353654 A1* 10/2024 Shim ..................... G02B 15/24

FOREIGN PATENT DOCUMENTS

CN 103858044 A 6/2014
CN 109459834 A 3/2019
CN 112748518 A 5/2021
JP 5825845 B2 10/2015
TW I655472 B 4/2019

* cited by examiner

*Primary Examiner* — Balram T Parbadia
(74) *Attorney, Agent, or Firm* — McClure, Qualey & Rodack, LLP

(57) ABSTRACT

A lens assembly includes a first, second, third, and fourth in order from an object side to an image side along an optical axis. The first lens is a meniscus lens with positive refractive power and includes a convex surface facing the object side and a concave surface facing the image side. The second lens is with negative refractive power. The third lens is with positive refractive power. The fourth lens is a meniscus lens with refractive power. The lens assembly satisfies at least one of following conditions: $-0.1 \le R_{11}/R_{42} \le 0.53$; $2 \le TTL/SD4 \le 7$; $0.1 \le SD1/f \le 0.6$.

19 Claims, 19 Drawing Sheets

Distortion

Distortion

LENS ASSEMBLY

BACKGROUND OF THE INVENTION

Field of the Invention

The invention relates to a lens assembly.

Description of the Related Art

The current development trend of a lens assembly is toward high resolution. In addition, the number of lenses used in lens assembly is increasing, making the total length of the imaging lenses longer and longer, which can't satisfy such requirements of miniaturization. Therefore, the lens assembly needs a new structure in order to meet the requirements of high resolution and miniaturization at the same time.

BRIEF SUMMARY OF THE INVENTION

The invention provides a lens assembly to solve the above problems. The lens assembly of the invention is provided with characteristics of a decreased total length of the lens assembly, a higher resolution and still has a good optical performance.

The lens assembly in accordance with an exemplary embodiment of the invention includes a first lens, a second lens, a third lens, and a fourth lens, all of which are arranged in order from an object side to an image side along an optical axis. The first lens is a meniscus lens with positive refractive power, and includes a convex surface facing the object side and a concave surface facing the image side. The second lens is with negative refractive power. The third lens is with positive refractive power. The fourth lens is a meniscus lens with refractive power. The lens assembly satisfies at least one of following conditions: $-0.1 \le R_{11}/R_{42} \le 0.53$; $2 \le TTL/SD4 \le 7$; $0.1 \le SD1/f \le 0.6$; wherein $R_{11}$ is a radius of curvature of the object side surface of the first lens, $R_{42}$ is a radius of curvature of the image side surface of the fourth lens, TTL is an interval in mm from the object side surface of the first lens to an image plane along the optical axis, SD4 is an optical effective diameter in mm of the fourth lens, SD1 is an optical effective diameter in mm of the first lens, and f is an effective focal length in mm of the lens assembly. The basic operation of the lens assembly in the present invention can be achieved by satisfying the features of the exemplary embodiment without requiring other conditions.

In another exemplary embodiment, the second lens includes a concave surface facing the image side, and the third lens is a biconvex lens and includes a convex surface facing the object side and another convex surface facing the image side.

In yet another exemplary embodiment, the fourth lens is with positive refractive power.

In another exemplary embodiment, the fourth lens is with negative refractive power.

In yet another exemplary embodiment, the second lens further includes another concave surface facing the object side, and the fourth lens includes a convex surface facing the object side and a concave surface facing the image side.

In another exemplary embodiment, the second lens includes a convex surface facing the object side, and the fourth lens includes a concave surface facing the object side and a convex surface facing the image side.

In yet another exemplary embodiment, the fourth lens includes a concave surface facing the object side and a convex surface facing the image side while the second lens includes a convex surface facing the object side, and the fourth lens includes a convex surface facing the object side and a concave surface facing the image side while the second lens includes a concave surface facing the object side.

In another exemplary embodiment, the lens assembly further includes a stop disposed between the first lens and the second lens.

In yet another exemplary embodiment, the lens assembly further includes a stop disposed between the first lens and the second lens, and the lens assembly satisfies at least one of following conditions: $0 \le SD4/TTL \le 0.5$; $0.05 \le SL1/TTL \le 0.5$; $0.1 \le SD4/SL2 \le 0.8$; wherein TTL is an interval in mm from the object side surface of the first lens to the image plane along the optical axis, SD4 is an optical effective diameter in mm of the fourth lens, SL1 is an interval in mm from the object side surface of the first lens to the stop along the optical axis, and SL2 is an interval in mm from the stop to the image plane along the optical axis.

In another exemplary embodiment, the lens assembly satisfies at least one of following conditions: $-10 \le f4/BFL \le -3$; $19 \le |f4/BFL| \le 52$ ; wherein $f_4$ is an effective focal length in mm of the fourth lens and BFL is an interval in mm from the image side surface of the fourth lens to the image plane along the optical axis.

The lens assembly in accordance with another exemplary embodiment of the invention includes a first lens, a second lens, a third lens, and a fourth lens, all of which are arranged in order from an object side to an image side along an optical axis. The first lens is a meniscus lens with positive refractive power, and includes a convex surface facing the object side and a concave surface facing the image side. The second lens is with negative refractive power. The third lens is with positive refractive power. The fourth lens is a meniscus lens with refractive power. The fourth lens comprises a concave surface facing the object side and a convex surface facing the image side while the second lens comprises a convex surface facing the object side, or the fourth lens comprises a convex surface facing the object side and a concave surface facing the image side while the second lens comprises a concave surface facing the object side. The lens assembly satisfies at least one of following conditions: $0.1 \le SD1/f \le 0.6$; wherein SD1 is an optical effective diameter in mm of the first lens and f is an effective focal length in mm of the lens assembly. The basic operation of the lens assembly in the present invention can be achieved by satisfying the features of the exemplary embodiment without requiring other conditions.

In another exemplary embodiment, the lens assembly satisfies at least one of following conditions: $-0.1 \le R_{11}/R_{42} \le 0.53$; $2 \le TTL/SD4 \le 7$; $-10 \le f4/BFL \le -3$; $0 \le SD4/TTL \le 0.5$; $19 \le |f4/BFL| \le 52$ ; wherein $R_{11}$ is a radius of curvature of the object side surface of the first lens, $R_{42}$ is a radius of curvature of the image side surface of the fourth lens, TTL is an interval in mm from the object side surface of the first lens to an image plane along the optical axis, SD4 is an optical effective diameter in mm of the fourth lens, $f_4$ is an effective focal length in mm of the fourth lens, BFL is an interval in mm from the image side surface of the fourth lens to an image plane along the optical axis, and f is an effective focal length in mm of the lens assembly In yet another exemplary embodiment, the fourth lens is with positive refractive power or with negative refractive power.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
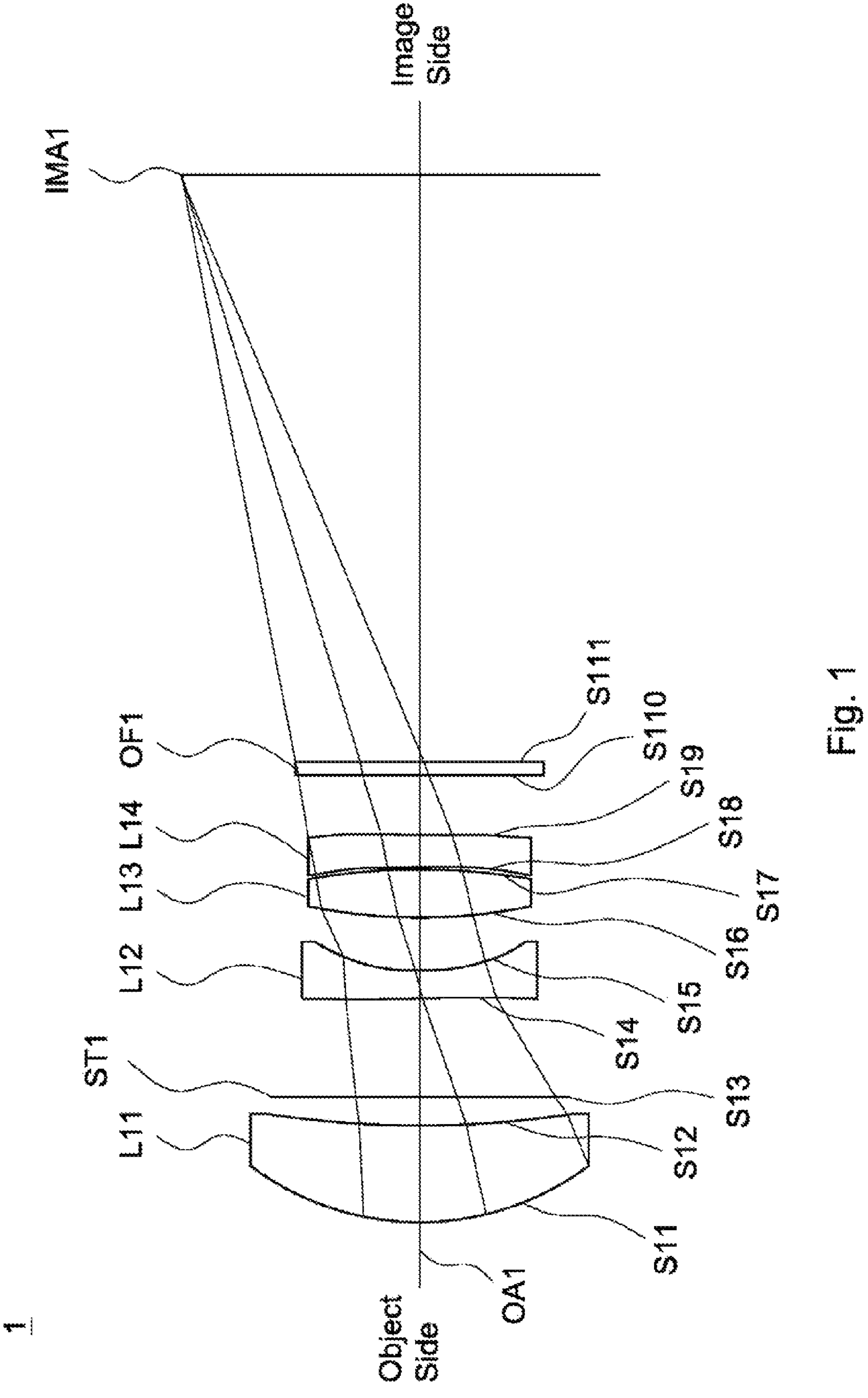
FIG. 1 is a lens layout and optical path diagram of a lens assembly in accordance with a first embodiment of the invention.

The following description is made for the purpose of illustrating the general principles of the invention and should not be taken in a limiting sense. The scope of the invention is best determined by reference to the appended claims.

The present invention provides a lens assembly including a first lens, a second lens, a third lens, and a fourth lens. The first lens is a meniscus lens with positive refractive power, and includes a convex surface facing an object side and a concave surface facing an image side. The second lens is with negative refractive power. The third lens is with positive refractive power. The fourth lens is a meniscus lens with refractive power. The first lens, the second lens, the third lens, and the fourth lens are arranged in order from the object side to the image side along an optical axis. The lens assembly satisfies at least one of following conditions: $-0.1 \le R_{11}/R_{42} \le 0.53$; $2 \le TTL/SD4 \le 7$; $0.1 \le SD1/f \le 0.6$; wherein $R_{11}$ is a radius of curvature of the object side surface of the first lens, $R_{42}$ is a radius of curvature of the image side surface of the fourth lens, TTL is an interval in mm from the object side surface of the first lens to an image plane along the optical axis, SD4 is an optical effective diameter in mm of the fourth lens, SD1 is an optical effective diameter in mm of the first lens, and f is an effective focal length in mm of the lens assembly.

Referring to Table 1, Table 2, Table 4, Table 5, Table 7, Table 8, Table 10, Table 11, Table 13, Table 14, Table 16, Table 17, Table 19, and Table 20, wherein Table 1, Table 4, Table 7, Table 10, Table 13, Table 16, and Table 19 show optical specification in accordance with a first, second, third, fourth, fifth, sixth, and seventh embodiments of the invention respectively and Table 2, Table 5, Table 8, Table 11, Table 14, Table 17, and Table 20 show aspheric coefficient of each aspheric lens in Table 1, Table 4, Table 7, Table 10, Table 13, Table 16, and Table 19 respectively.

FIG. 1, FIG. 3, FIG. 5, FIG. 7, FIG. 9, FIG. 10, and FIG. 11 are lens layout and optical path diagrams of the lens assembly in accordance with the first, second, third, fourth, fifth, sixth, and seventh embodiments of the invention respectively. The first lens L11, L21, L31, L41, L51, L61, L71 are meniscus lenses with positive refractive power and made of glass material, wherein the object side surfaces S11, S21, S31, S41, S51, S61, S71 are convex surfaces, the image side surfaces S12, S22, S32, S42, S52, S62, S72 are concave surfaces, and the object side surfaces S11, S21, S31, S41, S51, S61, S71 and the image side surfaces S12, S22, S32, S42, S52, S62, S72 are aspheric surfaces.

The second lens L12, L22, L32, L42, L52, L62, L72 are with negative refractive power and made of plastic material, wherein the image side surfaces S15, S25, S35, S45, S55, S65, S75 are concave surfaces, and the object side surfaces S14, S24, S34, S44, S54, S64, S74 and the image side surfaces S15, S25, S35, S45, S55, S65, S75 are aspheric surfaces.

The third lens L13, L23, L33, L43, L53, L63, L73 are biconvex lenses with positive refractive power which helps to extend the distance of back focal length and made of plastic material, wherein the object side surfaces S16, S26, S36, S46, S56, S66, S76 are convex surfaces, the image side surfaces S17, S27, S37, S47, S57, S67, S77 are convex surfaces, and the object side surfaces S16, S26, S36, S46, S56, S66, S76 and the image side surfaces S17, S27, S37, S47, S57, S67, S77 are aspheric surfaces.

The fourth lens L14, L24, L34, L44, L54, L64, L74 are meniscus lenses with refractive power and made of plastic material, wherein the object side surfaces S18, S28, S38, S48, S58, S68, S78 and the image side surfaces S19, S29, S39, S49, S59, S69, S79 are aspheric surface.

The above positive and negative refractive power structure helps to improve resolution, correct aberrations, and correct chromatic aberrations. In addition, the lens assembly 1, 2, 3, 4, 5, 6, 7 satisfy at least one of the following conditions:

$$-0.1 \le R_{11}/R_{42} \le 0.53; \quad (1)$$

$$2 \le TTL/SD4 \le 7; \quad (2)$$

$$-10 \le f4/BFL \le -3; \quad (3)$$

$$0 \le SD4/TTL \le 0.5; \quad (4)$$

$$0.05 \le SL1/TTL \le 0.5; \quad (5)$$

$$0.1 \le SD4/SL2 \le 0.8; \quad (6)$$

$$0.1 \le SD1/f \le 0.6; \quad (7)$$

$$19 \le |f4/BFL| \le 52 \quad (8)$$

wherein $R_{11}$ is a radius of curvature of the object side surface S11, S21, S31, S41, S51, S61, S71 of the first lens L11, L21, L31, L41, L51, L61, L71 for the first to seventh embodiments, $R_{42}$ is a radius of curvature of the image side surface S19, S29, S39, S49, S59, S69, S79 of the fourth lens L14, L24, L34, L44, L54, L64, L74 for the first to seventh embodiments, TTL is an interval in mm from the object side surfaces S11, S21, S31, S41, S51, S61, S71 of the first lenses L11, L21, L31, L41, L51, L61, L71 to the image planes IMA1, IMA2, IMA3, IMA4, IMA5, IMA6, IMA7 along the optical axes OA1, OA2, OA3, OA4, OA5, OA6, OA7 respectively for the first to seventh embodiments, BFL is an interval in mm from the image side surfaces S19, S29, S39, S49, S59, S69, S79 of the fourth lenses L14, L24, L34, L44, L54, L64, L74 to the image planes IMA1, IMA2, IMA3, IMA4, IMA5, IMA6, IMA7 along the optical axes OA1, OA2, OA3, OA4, OA5, OA6, OA7 respectively for the first to seventh embodiments, f is an effective focal length of the lens assemblies 1, 2, 3, 4, 5, 6, 7 for the first to seventh embodiments, $f_4$ is an effective focal length of the fourth lenses L14, L24, L34, L44, L54, L64, L74 for the first to seventh embodiments, SD1 is an optical effective diameter in mm of the first lens L11, L21, L31, L41, L51, L61, L71 for the first to seventh embodiments, SD4 is an optical effective diameter in mm of the fourth lens L14, L24, L34, L44, L54, L64, L74 for the first to seventh embodiments, SL1 is an interval in mm from the object side surface S11, S21, S31, S41, S51, S61, S71 of the first lenses L11, L21, L31, L41, L51, L61, L71 to the stop ST1, ST2, ST3, ST4, ST5, ST6, ST7 along the optical axis OA1, OA2, OA3, OA4, OA5, OA6, OA7 respectively for the first to seventh embodiments, and SL2 is an interval in mm from the stop ST1, ST2, ST3, ST4, ST5, ST6, ST7 to the image plane IMA1, IMA2, IMA3, IMA4, IMA5, IMA6, IMA7 along the optical axis OA1, OA2, OA3, OA4, OA5, OA6, OA7 respectively for the first to seventh embodiments. With the lens assemblies 1, 2, 3, 4, 5, 6, 7 satisfying at least one of the above conditions (1)-(8), the total length of lens assembly can be effectively decreased, the resolution can be effectively increased, the aberration can be effectively corrected, and the chromatic aberration can be effectively corrected. The preferred embodiment of the present invention can be achieved when the lens assembly satisfies at least one of the conditions (1)-(8).

When the condition (1): $-0.1 \leq R_{11}/R_{42} \leq 0.53$ is satisfied, the manufacturability of the object side surface of the first lens can be effectively controlled, so that the system can effectively distribute the refractive power and reduce the sensitivity of the optical system. When the condition (2): $2 \leq TTL/SD4 \leq 7$ is satisfied, the total length of the lens assembly can be effectively control. When the condition (3): $-10 \leq f4/BFL \leq -3$ is satisfied, the back focal length of the lens assembly can be effectively control. When the condition (4): $0 \leq SD4/TTL \leq 0.5$ is satisfied, the total length of the lens assembly can be effectively control. When the condition (5): $0.05 \leq SL1/TTL \leq 0.5$ is satisfied, the focal length of the lens assembly can be effectively control. When the condition (6): $0.1 \leq SD4/SL2 \leq 0.8$ is satisfied, the outer diameter of the lens assembly can be effectively control. When the condition (7): $0.1 \leq SD1/f \leq 0.6$ is satisfied, the focal length of the lens assembly can be effectively control. When the condition (8): $19 \leq |f4/BFL| \leq 52$ is satisfied, the back focal length of the lens assembly can be effectively control.

A detailed description of a lens assembly in accordance with a first embodiment of the invention is as follows. Referring to FIG. 1, the lens assembly 1 includes a first lens L11, a stop ST1, a second lens L12, a third lens L13, a fourth lens L14, and an optical filter OF1. The first lens L11, the stop ST1, the second lens L12, the third lens L13, the fourth lens L14 and the optical filter OF1 in order from an object side to an image side along an optical axis OA1. In operation, an image of light rays from the object side is formed at an image plane IMA1.

According to the foregoing, wherein: the second lens L12 is a biconcave lens, wherein the object side surface S14 is a concave surface; the fourth lens L14 is meniscus lens with negative refractive power, wherein the object side surface S18 is a convex surface and the image side surface S19 is a concave surface; both of the object side surface S110 and image side surface S111 of the optical filter OF1 are plane surfaces; the combined focal length of the second lens L12, the third lens L13 and the fourth lens L14 is −12.7753 mm. With the above design of the lenses and stop ST1 and at least any one of the conditions (1)-(7) satisfied, the lens assembly 1 can have an effective decreased the total length, an effective increased resolution, an effective corrected aberration, and is capable of an effective corrected chromatic aberration. The preferred embodiment of the present invention can be achieved when the lens assembly satisfies conditions (1)-(7), refractive power distribution, and surface shape.

Table 1 shows the optical specification of the lens assembly 1 in FIG. 1.

TABLE 1

Effective Focal Length = 16.625 mm
F-number = 3.32
Total Lens Length = 15.73 mm
Field of View = 23.78 degrees

| Surface Number | Radius of Curvature (mm) | Thickness (mm) | Nd | Vd | Effective Focal Length (mm) | Remark |
|---|---|---|---|---|---|---|
| S11 | 4.147924847 | 1.45 | 1.62 | 64.0 | 8.2663 | L11 |
| S12 | 18.766751 | 0.419577542 | | | | |
| S13 | ∞ | 1.470025991 | | | | ST1 |
| S14 | −24.52125773 | 0.401411229 | 1.67 | 19.2 | −4.7659 | L12 |
| S15 | 3.743874668 | 0.777925908 | | | | |
| S16 | 16.13529927 | 0.736419466 | 1.66 | 20.4 | 8.1015 | L13 |
| S17 | −7.979545851 | 0.011641257 | | | | |
| S18 | 24.12277307 | 0.4826548 | 1.54 | 56.1 | −62.3982 | L14 |
| S19 | 13.92709675 | 0.875 | | | | |
| S110 | ∞ | 0.21 | 1.52 | 64.2 | | OF1 |
| S111 | ∞ | 8.703198374 | | | | |

The aspheric surface sag z of each aspheric lens in table 1 can be calculated by the following formula:

$$z = ch^2 / \left\{1 + \left[1 - (k+1)c^2h^2\right]^{1/2}\right\} + Ah^4 + Bh^6 + Ch^8 + Dh^{10} + Eh^{12} + Fh^{14} + Gh^9 + Hh^{10} + Ih^{12} + Jh^{14} + Kh^{16} + Lh^{18} + Mh^{20}$$

where c is curvature, h is the vertical distance from the lens surface to the optical axis, k is conic constant and A, B, C, D, E, F, G, H, I, J, K, L and M are aspheric coefficients. In the first embodiment, the conic constant k and the aspheric coefficients A, B, C, D, E, F, G, H, I, J, K, L, M of each aspheric surface are shown in Table 2.

TABLE 2

| Surface Number | k<br>E<br>J | A<br>F<br>K | B<br>G<br>L | C<br>H<br>M | D<br>I |
|---|---|---|---|---|---|
| S11 | −6.4439E−02 | −6.1028E−04 | 2.6582E−04 | −7.0752E−05 | −1.4812E−06 |
| | 1.1649E−05 | 1.0701E−05 | 9.5655E−08 | −2.9408E−06 | −4.0063E−08 |
| | 6.5503E−08 | 5.3389E−09 | −2.2559E−09 | 1.6934E−10 | |
| S12 | 2.7635E+01 | 1.1328E−04 | −1.5418E−03 | 1.4107E−03 | −5.6861E−04 |
| | 6.2714E−05 | 4.8673E−06 | 4.5209E−06 | 1.3297E−06 | −5.2385E−07 |
| | −4.1974E−08 | 1.2814E−08 | 4.3439E−09 | −5.7953E−10 | |
| S14 | 8.8806E+01 | 1.1367E−02 | 3.9585E−04 | −1.6455E−03 | −4.4937E−04 |
| | 7.6910E−05 | −2.4349E−04 | 1.8549E−04 | 1.1655E−04 | 2.3859E−05 |
| | −5.6383E−06 | −3.7304E−06 | 8.1173E−07 | −5.2812E−08 | |
| S15 | 1.8372E+00 | 1.3320E−02 | 5.6190E−03 | −2.5736E−03 | −2.7673E−03 |
| | −1.3329E−03 | −6.6618E−05 | 3.0452E−04 | 1.8971E−04 | −1.4237E−04 |
| | 4.1155E−04 | −2.7058E−04 | 8.0516E−05 | −9.9580E−06 | |
| S16 | 8.4570E+01 | 1.3477E−02 | 1.3161E−02 | −1.4222E−03 | −2.1761E−03 |
| | −1.0022E−03 | −5.2723E−04 | −1.0959E−05 | 9.4134E−05 | −2.4619E−06 |
| | 1.4194E−06 | −7.0103E−07 | 4.2309E−06 | −1.6412E−06 | |
| S17 | −2.4254E−01 | −4.3031E−03 | 4.8713E−03 | 4.7673E−04 | −1.3216E−03 |
| | −3.3130E−04 | 1.0799E−04 | 1.3808E−05 | 6.2631E−05 | 1.0138E−05 |
| | −3.3335E−06 | −8.2253E−06 | −2.2555E−06 | 1.2735E−06 | |
| S18 | −8.0799E+01 | −3.4530E−02 | −1.4439E−02 | −4.8648E−03 | 2.6305E−03 |
| | 2.1583E−03 | 8.0278E−04 | 2.4471E−04 | −7.9020E−05 | −1.3095E−04 |
| | −1.9250E−05 | 1.2869E−06 | 2.7392E−06 | 9.9292E−08 | |
| S19 | −6.0394E+01 | −1.4620E−02 | −2.4514E−02 | 5.2519E−03 | 2.0567E−03 |
| | 4.2265E−04 | 2.1792E−04 | 5.3873E−05 | −7.1093E−05 | −7.2708E−05 |
| | −4.2964E−06 | 4.2830E−06 | 4.6274E−06 | −1.2618E−06 | |

Table 3 shows the parameters and condition values for conditions (1)-(7) in accordance with the first embodiment of the invention. It can be seen from Table 3 that the lens assembly 1 of the first embodiment satisfies the conditions (1)-(7).

TABLE 3

| | | | | | |
|---|---|---|---|---|---|
| BFL | 9.788 mm | SD1 | 5.000 mm | SD4 | 3.280 mm |
| SL1 | 1.870 mm | SL2 | 13.668 mm | f4/BFL | −6.375 |
| $R_{11}/R_{42}$ | 0.298 | TTL/SD4 | 4.738 | SD4/SL2 | 0.240 |
| SD4/TTL | 0.211 | SL1/TTL | 0.120 | | |
| SD1/f | 0.301 | | | | |

Figure 2A:
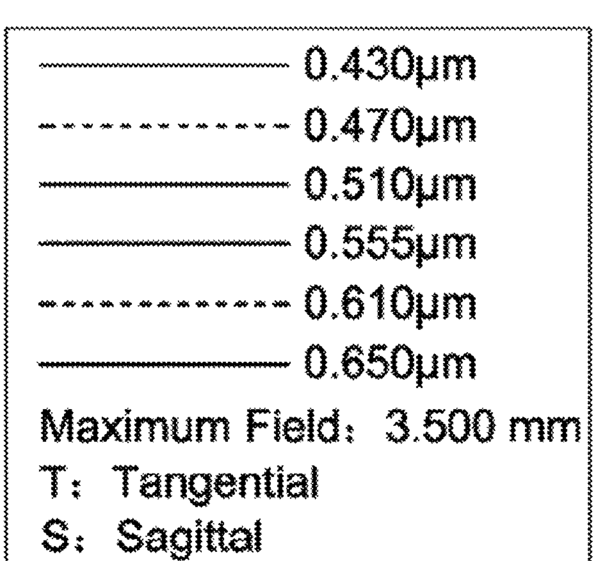
FIG. 2A, FIG. 2B, and FIG. 2C depict a field curvature diagram, a distortion diagram, and a modulation transfer function diagram of the lens assembly in accordance with the first embodiment of the invention, respectively.
Figure 2A:
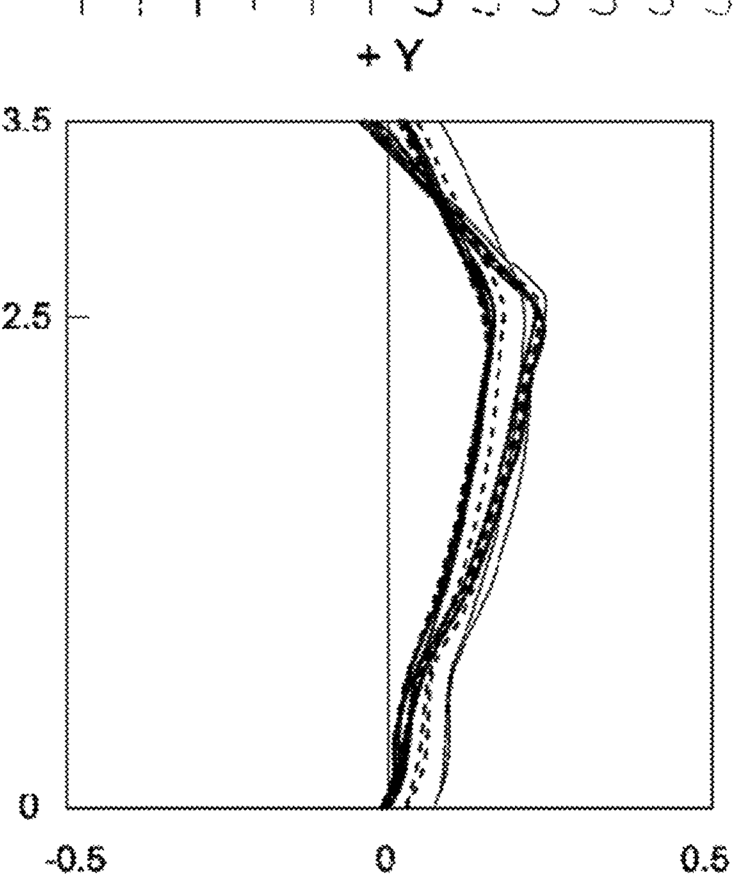
Figure 2B:
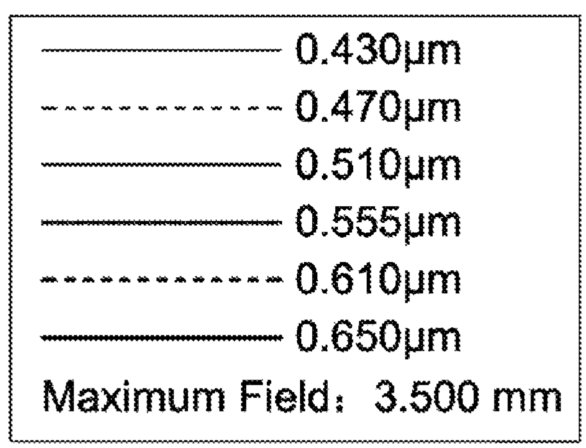
Figure 2B:
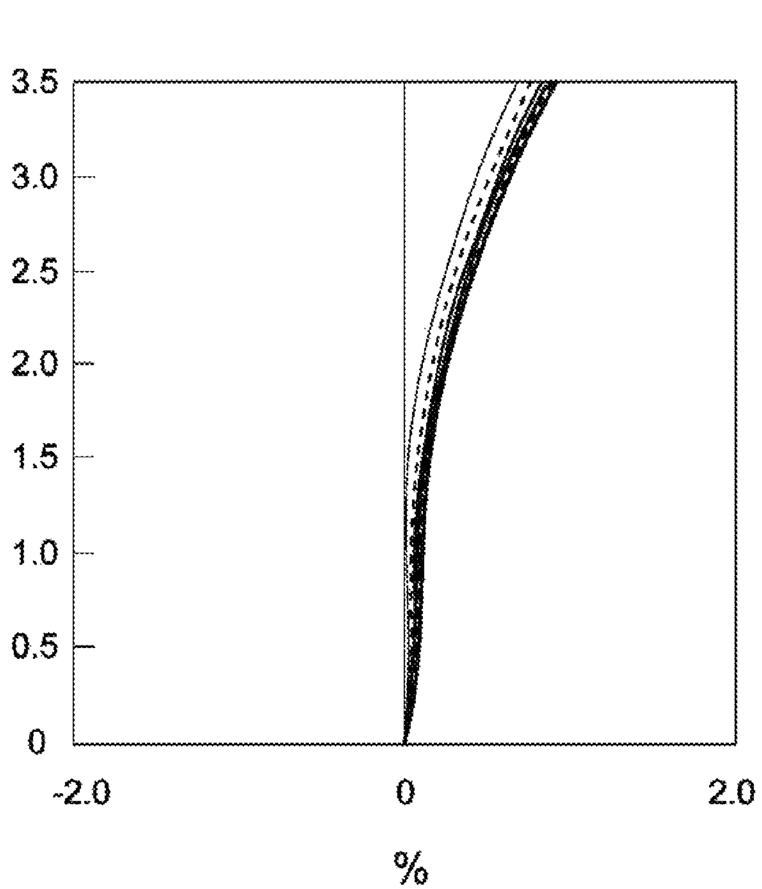
Figure 2C:
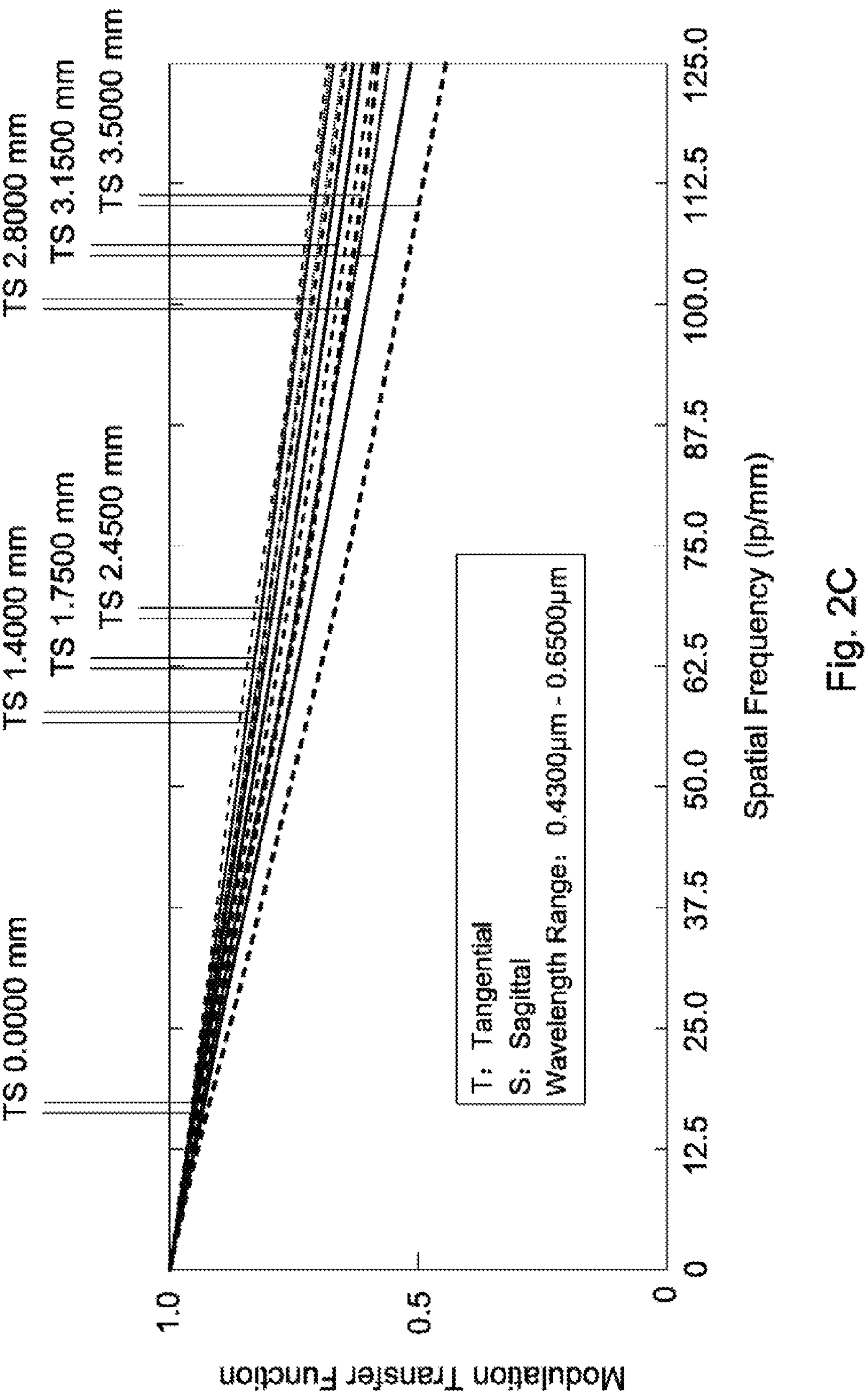

By the above arrangements of the lenses and stop ST1, the lens assembly 1 of the first embodiment can meet the requirements of optical performance. It can be seen from FIG. 2A that the field curvature of tangential direction and sagittal direction in the lens assembly 1 of the first embodiment ranges from −0.10 mm to 0.30 mm. It can be seen from FIG. 2B that the distortion in the lens assembly 1 of the first embodiment ranges from 0% to 1%. It can be seen from FIG. 2C that the modulation transfer function of tangential direction and sagittal direction in the lens assembly 1 of the first embodiment ranges from 0.44 to 1.0. It is obvious that the field curvature and the distortion of the lens assembly 1 of the first embodiment can be corrected effectively, and the image resolution can meet the requirement. Therefore, the lens assembly 1 of the first embodiment is capable of good optical performance.

Figure 3:
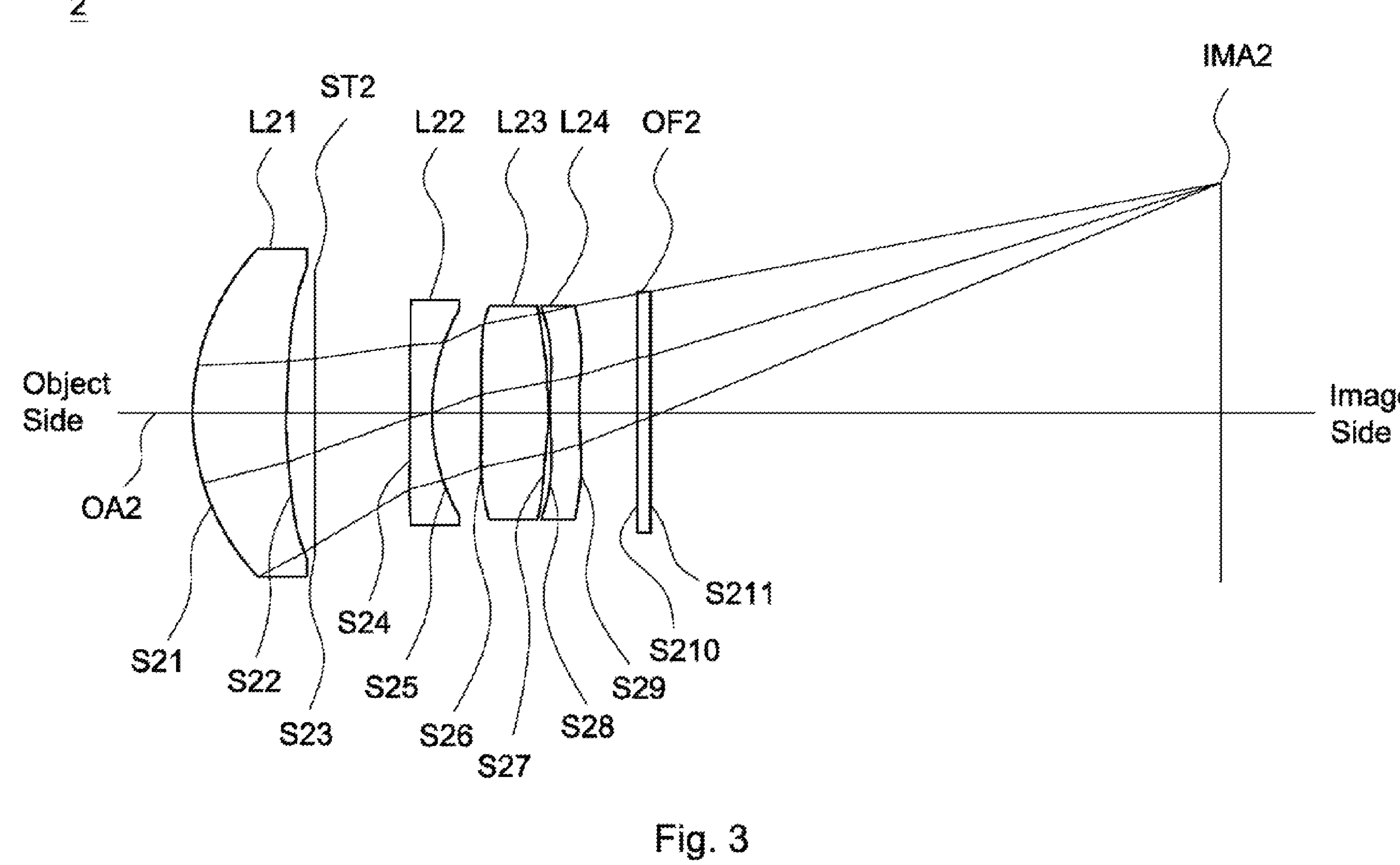
FIG. 3 is a lens layout and optical path diagram of a lens assembly in accordance with a second embodiment of the invention.

Referring to FIG. 3, FIG. 3 is a lens layout and optical path diagram of a lens assembly in accordance with a second embodiment of the invention. The lens assembly 2 includes a first lens L21, a stop ST2, a second lens L22, a third lens L23, a fourth lens L24, and an optical filter OF2. The first lens L21, the stop ST2, the second lens L22, the third lens L23, the fourth lens L24 and the optical filter OF2 in order from an object side to an image side along an optical axis OA2. In operation, an image of light rays from the object side is formed at an image plane IMA2.

According to the foregoing, wherein: the second lens L22 is a biconcave lens, wherein the object side surface S24 is a concave surface; the fourth lens L24 is meniscus lens with negative refractive power, wherein the object side surface S28 is a convex surface and the image side surface S29 is a concave surface; both of the object side surface S210 and image side surface S211 of the optical filter OF2 are plane surfaces; the combined focal length of the second lens L22, the third lens L23 and the fourth lens L24 is −12.7753 mm. With the above design of the lenses and stop ST2 and at least any one of the conditions (1)-(7) satisfied, the lens assembly 2 can have an effective decreased the total length, an effective increased resolution, an effective corrected aberration, and is capable of an effective corrected chromatic aberration. The preferred embodiment of the present invention can be achieved when the lens assembly satisfies conditions (1)-(7), refractive power distribution, and surface shape.

Table 4 shows the optical specification of the lens assembly 2 in FIG. 3.

TABLE 4

| Effective Focal Length = 16.625 mm<br>F-number = 3.32<br>Total Lens Length = 15.730 mm<br>Field of View = 23.78 degrees | | | | | | |
|---|---|---|---|---|---|---|
| Surface Number | Radius of Curvature (mm) | Thickness (mm) | Nd | Vd | Effective Focal Length (mm) | Remark |
| S21 | 3.813960274 | 1.45 | 1.62 | 64.0 | 8.4788 | L21 |
| S22 | 11.84269497 | 0.419577542 | | | | |
| S23 | ∞ | 1.470025991 | | | | ST2 |
| S24 | −39.79215657 | 0.3171875 | 1.67 | 19.2 | −4.8804 | L22 |
| S25 | 3.61842274 | 0.757462017 | | | | |
| S26 | 42.27487385 | 1.037295427 | 1.66 | 20.4 | 8.1476 | L23 |
| S27 | −6.176825027 | 0.026247709 | | | | |
| S28 | 12.13935081 | 0.456814034 | 1.54 | 56.1 | −61.2600 | L24 |
| S29 | 8.750434221 | 0.875 | | | | |
| S210 | ∞ | 0.21 | 1.52 | 64.2 | | OF2 |
| S211 | ∞ | 8.710559045 | | | | |

The definition of aspheric surface sag z of each aspheric lens in table 4 is the same as that of in Table 1, and is not described here again. In the second embodiment, the conic constant k and the aspheric coefficients A, B, C, D, E, F, G, H, I, J, K, L, M of each aspheric surface are shown in Table 5.

TABLE 5

| Surface Number | k<br>E<br>J | A<br>F<br>K | B<br>G<br>L | C<br>H<br>M | D<br>I |
|---|---|---|---|---|---|
| S21 | 1.1568E−01 | 7.59394E−05 | 6.21522E−05 | 7.27932E−05 | 1.00185E−06 |
| | 1.26804E−05 | 1.00727E−05 | 3.37085E−06 | −1.99825E−06 | 1.78367E−07 |
| | 8.97075E−08 | −5.95448E−10 | −3.63108E−09 | 4.65048E−10 | |
| | 2.2061E+01 | 4.6453E−04 | −1.3465E−03 | 1.3093E−03 | −5.7192E−04 |
| | 4.7498E−05 | 1.6454E−05 | 8.9817E−06 | 4.0953E−06 | −4.4634E−07 |
| | −2.9007E−07 | −8.5501E−10 | 1.6589E−08 | −1.4402E−09 | |
| S24 | 4.0992E+01 | 5.9955E−04 | 8.4063E−04 | 7.4190E−04 | 1.0141E−03 |
| | 4.2098E−04 | −3.1647E−04 | −2.6385E−05 | −2.8861E−05 | −5.4869E−07 |
| | 6.1563E−06 | −1.2818E−06 | 1.2473E−07 | 5.7491E−09 | |
| S25 | 2.0780E+00 | −1.9316E−04 | −1.5431E−04 | 1.2021E−03 | 7.8417E−04 |
| | 1.6881E−04 | −4.9117E−05 | −1.2150E−06 | −3.5902E−05 | 3.4928E−05 |
| | −4.8214E−06 | −5.0362E−06 | −8.5000E−07 | 7.2681E−07 | |
| S26 | 4.1167E+02 | 2.8879E−04 | 1.3475E−02 | −1.5414E−03 | −1.1485E−03 |
| | 1.7690E−04 | 1.1741E−04 | 2.4233E−04 | 1.1892E−04 | −1.3802E−05 |
| | −5.0989E−06 | −2.1514E−06 | 7.7666E−07 | −7.2672E−08 | |
| S27 | −2.5558E+01 | −8.5443E−03 | 2.6354E−03 | −9.7250E−04 | −1.4540E−03 |
| | −7.8403E−05 | 3.4522E−04 | 1.8306E−04 | 1.3970E−04 | 2.1228E−05 |
| | −8.1422E−06 | −1.9512E−06 | 1.7297E−06 | −4.3062E−07 | |
| S28 | −2.6311E−01 | −2.2842E−02 | −1.8202E−02 | −9.5410E−03 | 2.8426E−04 |
| | 1.1063E−03 | 3.5966E−04 | 1.5762E−04 | −1.5616E−05 | −9.8583E−06 |
| | 2.4486E−05 | −3.6625E−06 | −5.0095E−06 | 1.2185E−06 | |
| S29 | −5.2721E+01 | −1.0049E−02 | −2.7447E−02 | 1.0048E−03 | −5.1940E−05 |
| | −6.5488E−05 | 3.1896E−04 | 2.5273E−04 | 2.2384E−05 | −5.6656E−05 |
| | −1.6450E−05 | −4.0254E−07 | 4.3788E−06 | −8.1999E−07 | |

Table 6 shows the parameters and condition values for conditions (1)-(7) in accordance with the second embodiment of the invention. It can be seen from Table 6 that the lens assembly 2 of the second embodiment satisfies the conditions (1)-(7).

TABLE 6

| | | | | | |
|---|---|---|---|---|---|
| BFL | 9.796 mm | SD1 | 5.000 mm | SD4 | 3.184 mm |
| SL1 | 1.870 mm | SL2 | 13.861 mm | f4/BFL | −6.370 |
| $R_{11}/R_{42}$ | 0.436 | TTL/SD4 | 4.941 | SD4/SL2 | 0.230 |
| SD4/TTL | 0.202 | SL1/TTL | 0.119 | | |
| SD1/f | 0.301 | | | | |

Figure 4A:
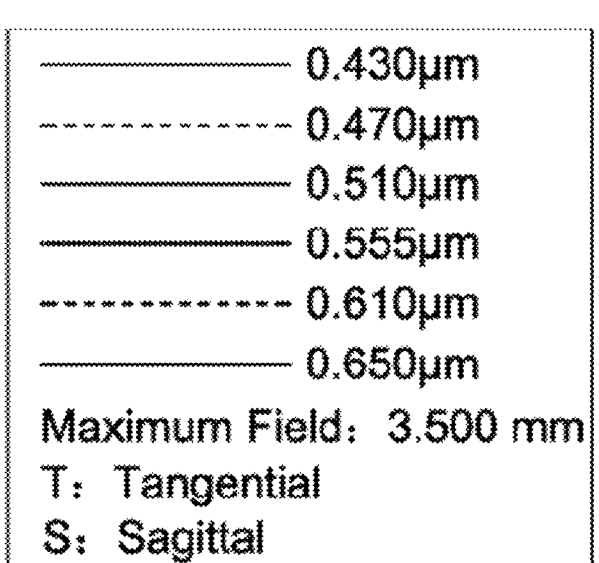
FIG. 4A, FIG. 4B, and FIG. 4C depict a field curvature diagram, a distortion diagram, and a modulation transfer function diagram of the lens assembly in accordance with the second embodiment of the invention, respectively.
Figure 4A:
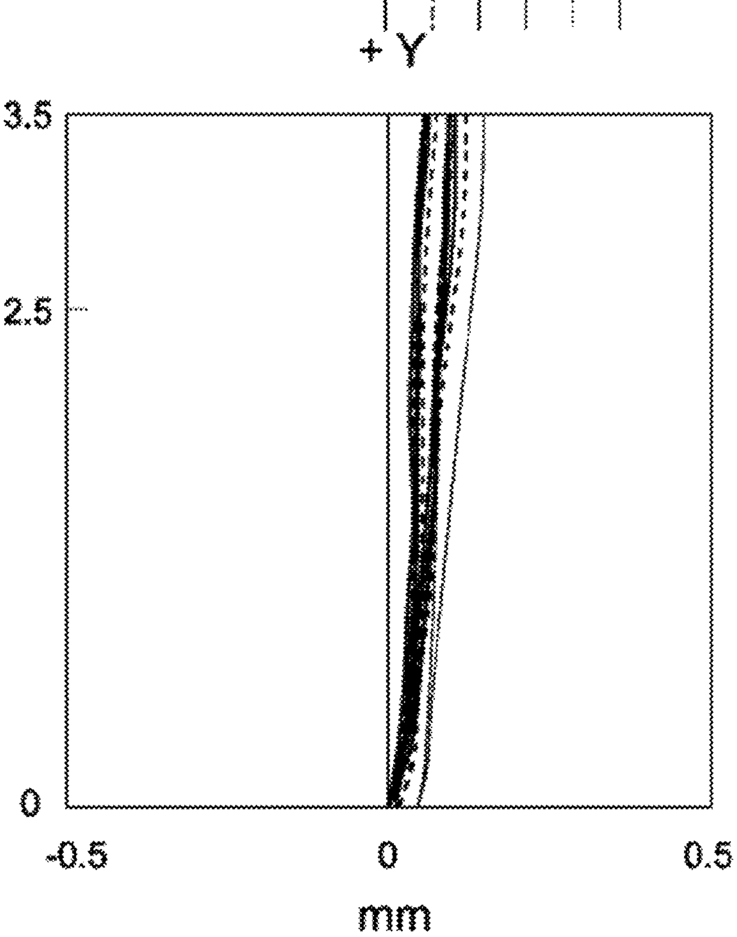
Figure 4B:
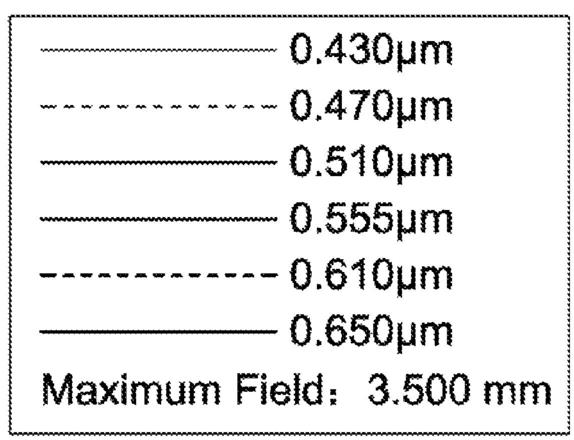
Figure 4B:
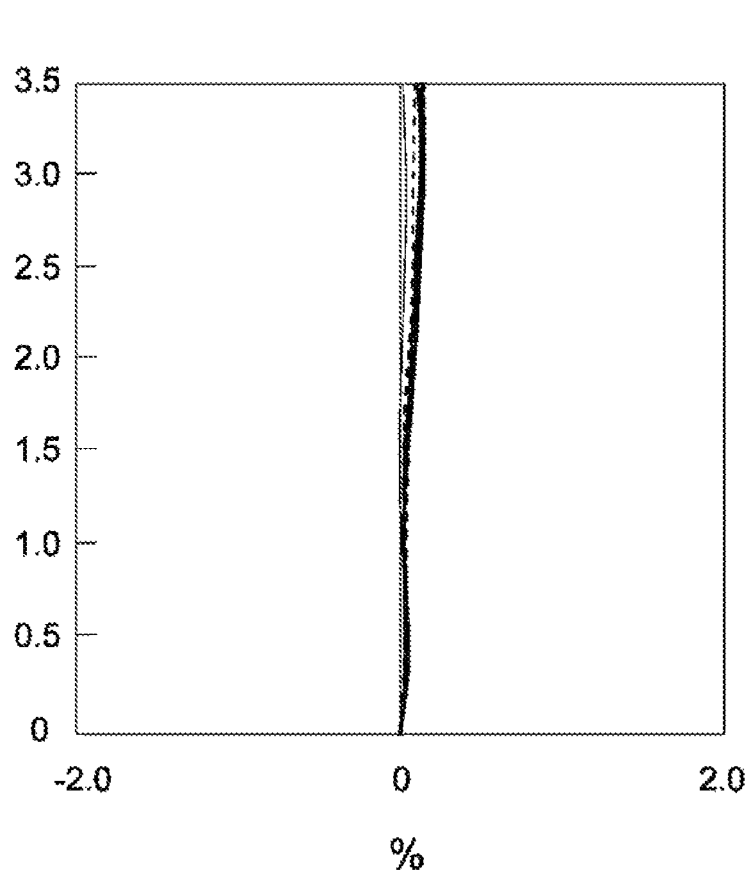
Figure 4C:
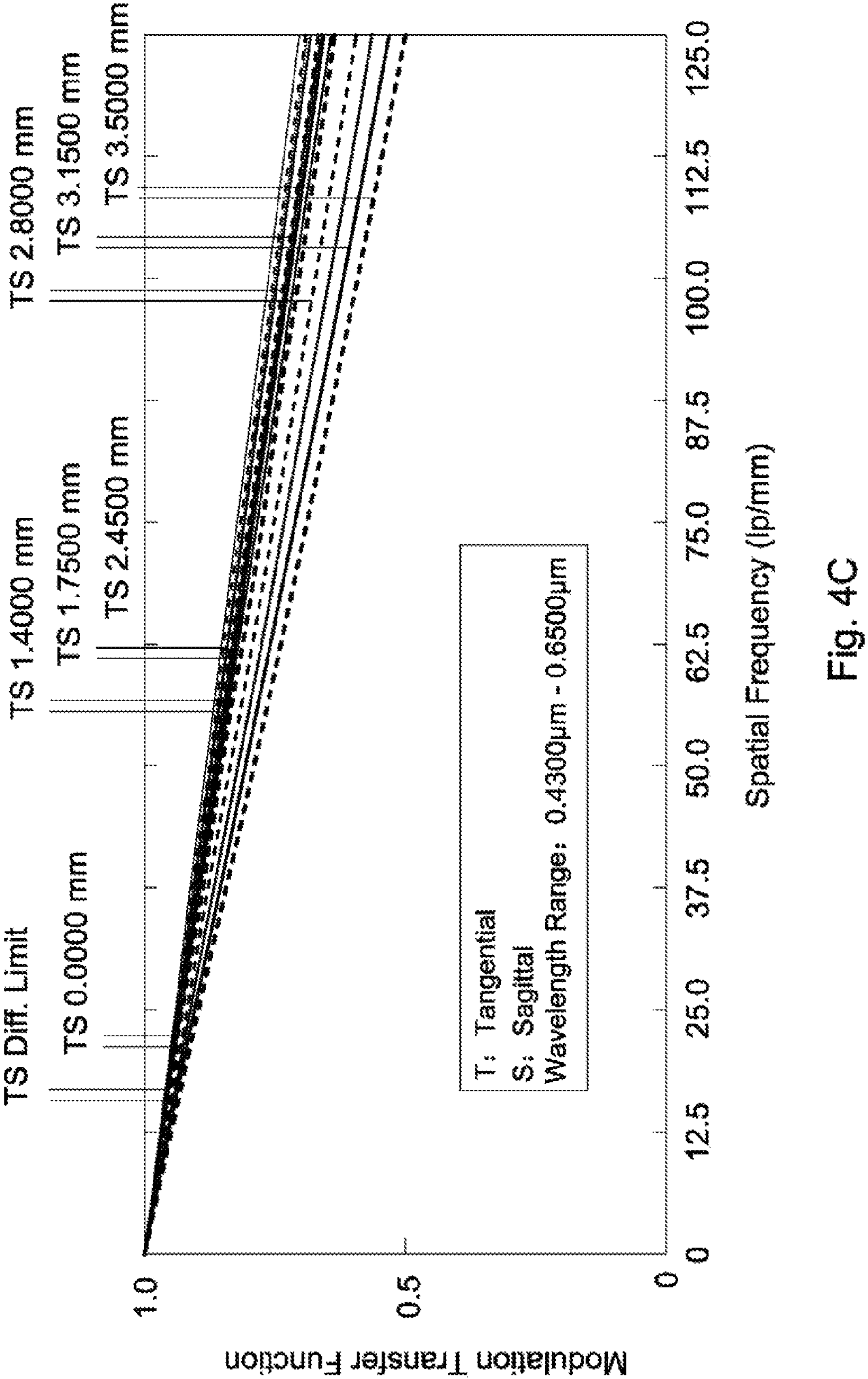

By the above arrangements of the lenses and stop ST2, the lens assembly 2 of the second embodiment can meet the requirements of optical performance. It can be seen from FIG. 4A that the field curvature of tangential direction and sagittal direction in the lens assembly 2 of the second embodiment ranges from 0 mm to 0.2 mm. It can be seen from FIG. 4B that the distortion in the lens assembly 2 of the second embodiment ranges from 0% to 0.2%. It can be seen from FIG. 4C that the modulation transfer function of tangential direction and sagittal direction in the lens assembly 2 of the second embodiment ranges from 0.50 to 1.0. It is obvious that the field curvature and the distortion of the lens assembly 2 of the second embodiment can be corrected effectively, and the image resolution can meet the requirement. Therefore, the lens assembly 2 of the second embodiment is capable of good optical performance.

Figure 5:
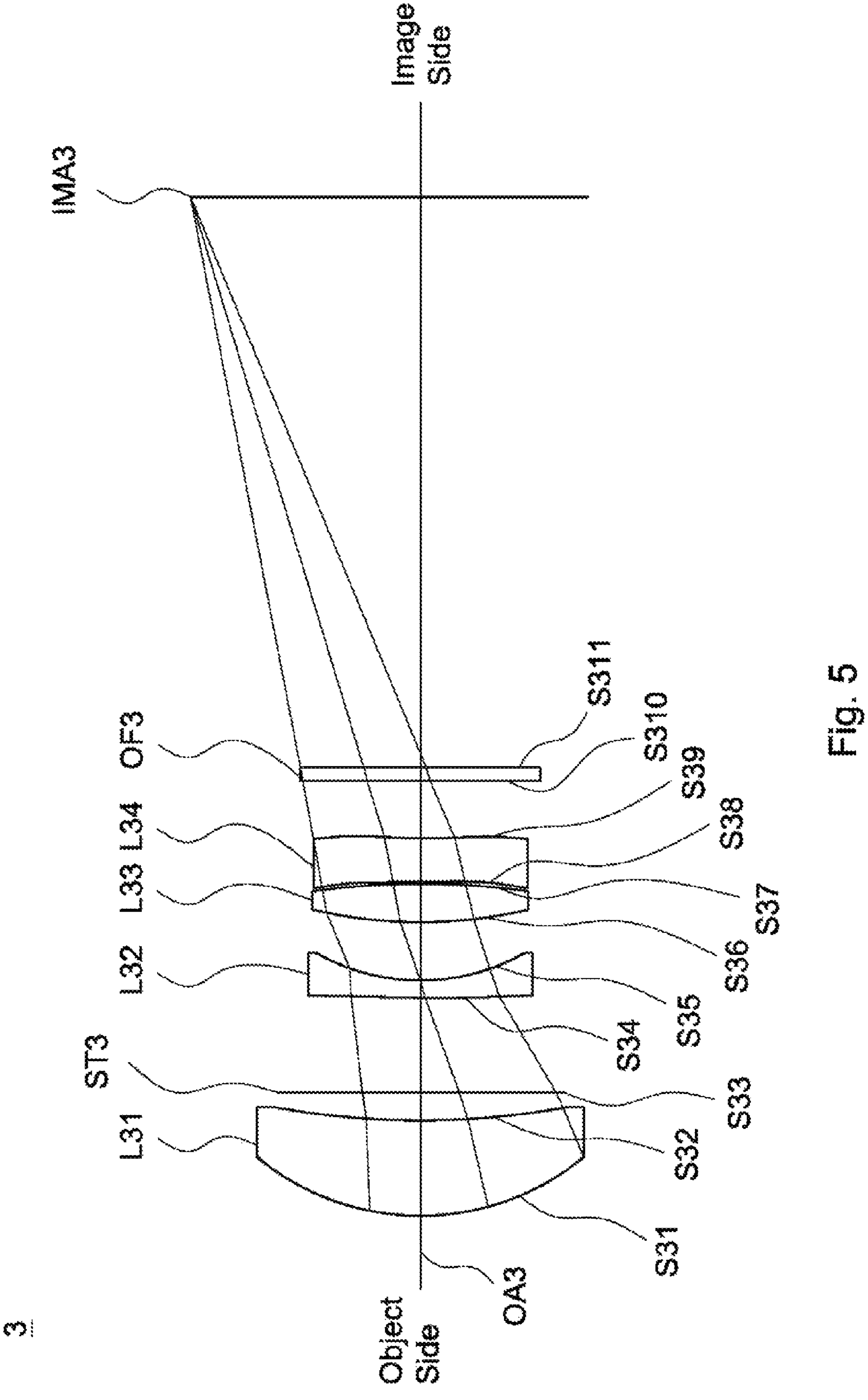
FIG. 5 is a lens layout and optical path diagram of a lens assembly in accordance with a third embodiment of the invention.

Referring to FIG. 5, FIG. 5 is a lens layout and optical path diagram of a lens assembly in accordance with a third embodiment of the invention. The lens assembly 3 includes a first lens L31, a stop ST3, a second lens L32, a third lens L33, a fourth lens L34, and an optical filter OF3. The first lens L31, the stop ST3, the second lens L32, the third lens L33, the fourth lens L34 and the optical filter OF3 in order from an object side to an image side along an optical axis OA3. In operation, an image of light rays from the object side is formed at an image plane IMA3.

According to the foregoing, wherein: the second lens L32 is a biconcave lens, wherein the object side surface S34 is a concave surface; the fourth lens L34 is meniscus lens with negative refractive power, wherein the object side surface S38 is a convex surface and the image side surface S39 is a concave surface; both of the object side surface S310 and image side surface S311 of the optical filter OF3 are plane surfaces; the combined focal length of the second lens L32, the third lens L33 and the fourth lens L34 is −13.9197 mm. With the above design of the lenses and stop ST3 and at least any one of the conditions (1)-(7) satisfied, the lens assembly 3 can have an effective decreased the total length, an effective increased resolution, an effective corrected aberration, and is capable of an effective corrected chromatic aberration. The preferred embodiment of the present invention can be achieved when the lens assembly satisfies conditions (1)-(7), refractive power distribution, and surface shape.

Table 7 shows the optical specification of the lens assembly 3 in FIG. 5.

TABLE 7

Effective Focal Length = 16.625 mm
F-number = 3.32
Total Lens Length = 15.573 mm
Field of View = 23.78 degrees

| Surface Number | Radius of Curvature (mm) | Thickness (mm) | Nd | Vd | Effective Focal Length (mm) | Remark |
|---|---|---|---|---|---|---|
| S31 | 4.014074097 | 1.45 | 1.62 | 64.0 | 8.5318 | L31 |
| S32 | 14.30015395 | 0.419577542 | | | | |
| S33 | ∞ | 1.470025991 | | | | ST3 |
| S34 | −121.6390606 | 0.240453499 | 1.67 | 19.2 | −5.0282 | L32 |
| S35 | 3.508147432 | 0.906434386 | | | | |
| S36 | 21.0313572 | 0.573724036 | 1.66 | 20.4 | 8.6742 | L33 |
| S37 | −7.897197038 | 0.011641257 | | | | |
| S38 | 19.19107249 | 0.694820162 | 1.54 | 56.1 | −89.1370 | L34 |
| S39 | 13.52521668 | 0.875 | | | | |
| S310 | ∞ | 0.21 | 1.52 | 64.2 | | OF3 |
| S311 | ∞ | 8.721678988 | | | | |

The definition of aspheric surface sag z of each aspheric lens in table 7 is the same as that of in Table 1, and is not described here again. In the third embodiment, the conic constant k and the aspheric coefficients A, B, C, D, E, F, G, H, I, J, K, L, M of each aspheric surface are shown in Table 8.

TABLE 8

| Surface Number | k<br>E<br>J | A<br>F<br>K | B<br>G<br>L | C<br>H<br>M | D<br>I |
|---|---|---|---|---|---|
| S31 | 5.6845E−03 | −4.1268E−04 | 1.3443E−04 | −4.5531E−05 | −1.2413E−05 |
| | 7.7148E−06 | 1.0746E−05 | 5.8031E−07 | −2.6496E−06 | −3.9125E−08 |
| | 5.2434E−08 | 3.4365E−09 | −1.7121E−09 | 1.3046E−10 | |
| S32 | 2.5310E+01 | −1.2028E−04 | −1.7237E−03 | 1.3102E−03 | −5.8602E−04 |
| | 3.8176E−05 | 4.9242E−06 | 7.3206E−06 | 1.9137E−06 | −1.0872E−06 |
| | −1.0494E−07 | 2.1320E−08 | 7.6734E−09 | −1.1071E−09 | |
| S34 | 2.0227E+02 | 3.6229E−03 | −2.3867E−04 | −8.4909E−04 | 2.8135E−04 |
| | 1.9142E−04 | −3.7413E−04 | 9.1843E−05 | 6.1110E−05 | 2.2515E−05 |
| | 5.7992E−06 | −3.1268E−06 | −2.2804E−07 | 5.3462E−08 | |
| S35 | 1.7154E+00 | 4.3386E−03 | 9.3395E−04 | −1.0614E−03 | −1.0215E−03 |
| | −6.3166E−04 | −1.9744E−04 | 6.3308E−05 | 7.2564E−06 | −1.5621E−04 |
| | 4.1678E−04 | −2.7090E−04 | 8.2877E−05 | −1.0279E−05 | |
| S36 | 1.3770E+02 | 9.0351E−03 | 1.5276E−02 | −5.5244E−04 | −1.7848E−03 |
| | −7.6205E−04 | −4.2334E−04 | 4.4481E−05 | 1.0216E−04 | −6.8774E−06 |
| | −1.4242E−05 | −2.0318E−06 | 4.9714E−06 | −8.4437E−07 | |
| S37 | −3.6267E+01 | −3.8818E−03 | 4.8847E−03 | 1.3861E−04 | −7.6840E−04 |
| | 1.0554E−04 | 2.1799E−04 | −9.1986E−05 | −6.2992E−05 | 1.5900E−06 |
| | 6.4387E−06 | −4.3853E−06 | −3.0148E−06 | 1.7193E−06 | |
| S38 | 4.7276E+01 | −2.1866E−02 | −1.3152E−02 | −5.8362E−03 | 1.6216E−03 |
| | 1.5979E−03 | 6.2093E−04 | 2.1727E−04 | −5.1118E−05 | −1.0901E−04 |
| | −1.4536E−05 | 1.9058E−06 | 3.3034E−06 | −1.0583E−07 | |
| S39 | −2.6060E+01 | −5.9842E−03 | −2.2870E−02 | 4.5682E−03 | 1.2814E−03 |
| | 1.1750E−04 | 1.5357E−04 | 4.7650E−05 | −6.0253E−05 | −4.0645E−05 |
| | 2.5165E−06 | 1.4501E−06 | 2.5557E−06 | −7.5700E−07 | |

Table 9 shows the parameters and condition values for conditions (1)-(7) in accordance with the third embodiment of the invention. It can be seen from Table 9 that the lens assembly 3 of the third embodiment satisfies the conditions (1)-(7).

TABLE 9

| | | | | | |
|---|---|---|---|---|---|
| BFL | 9.807 mm | SD1 | 5.000 mm | SD4 | 3.294 mm |
| SL1 | 1.870 mm | SL2 | 13.704 mm | f4/BFL | −9.089 |
| $R_{11}/R_{42}$ | 0.297 | TTL/SD4 | 4.728 | SD4/SL2 | 0.240 |
| SD4/TTL | 0.212 | SL1/TTL | 0.120 | | |
| SD1/f | 0.301 | | | | |

Figure 6A:
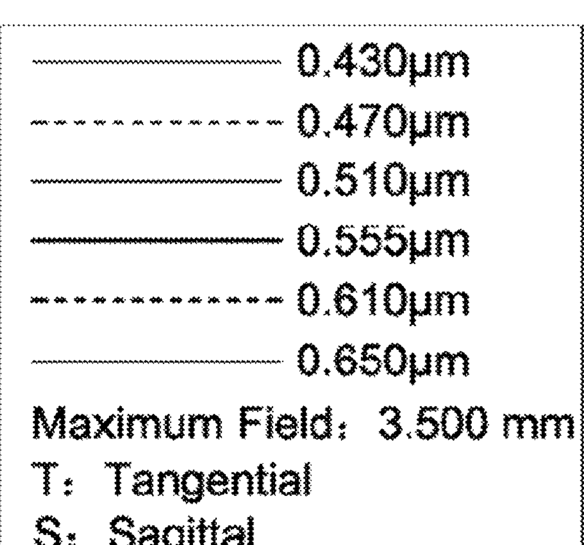
FIG. 6A, FIG. 6B, and FIG. 6C depict a field curvature diagram, a distortion diagram, and a modulation transfer function diagram of the lens assembly in accordance with the third embodiment of the invention, respectively.
Figure 6A:
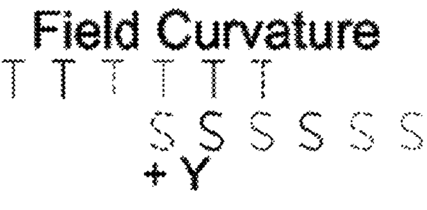
Figure 6A:
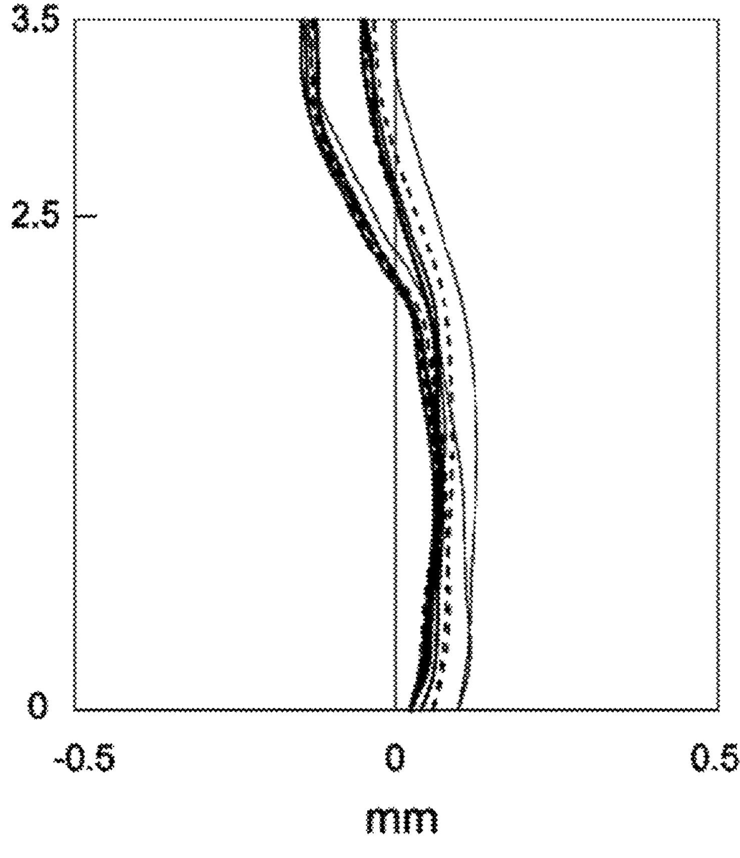
Figure 6B:
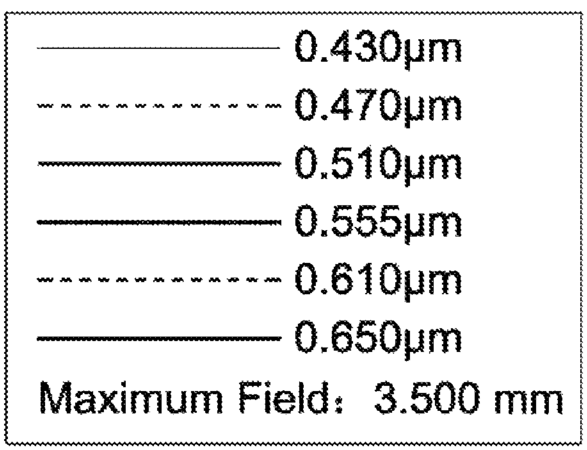
Figure 6B:
Figure 6B:
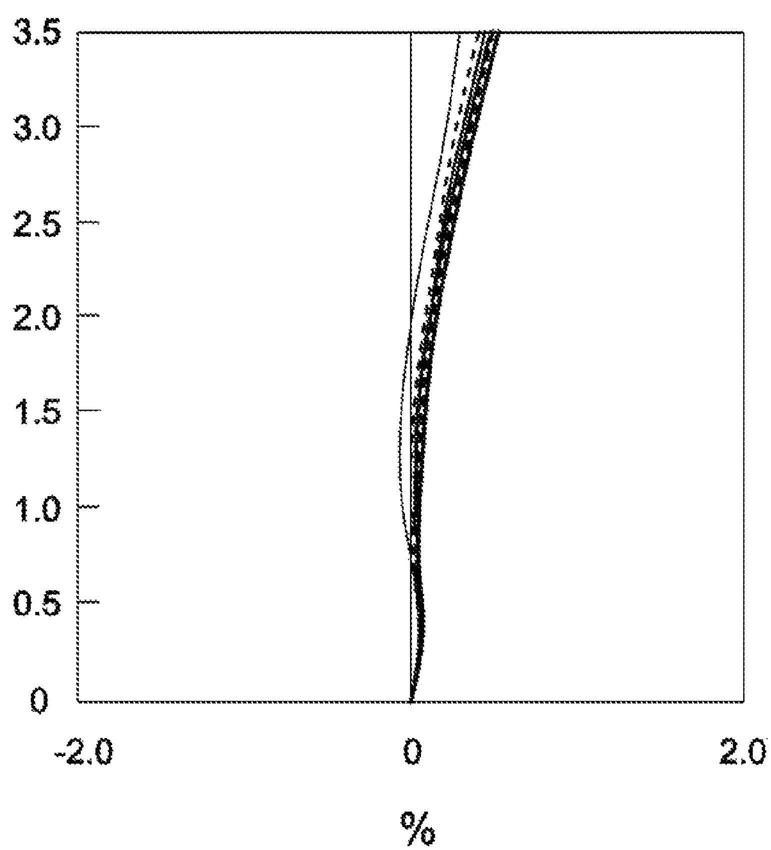
Figure 6C:
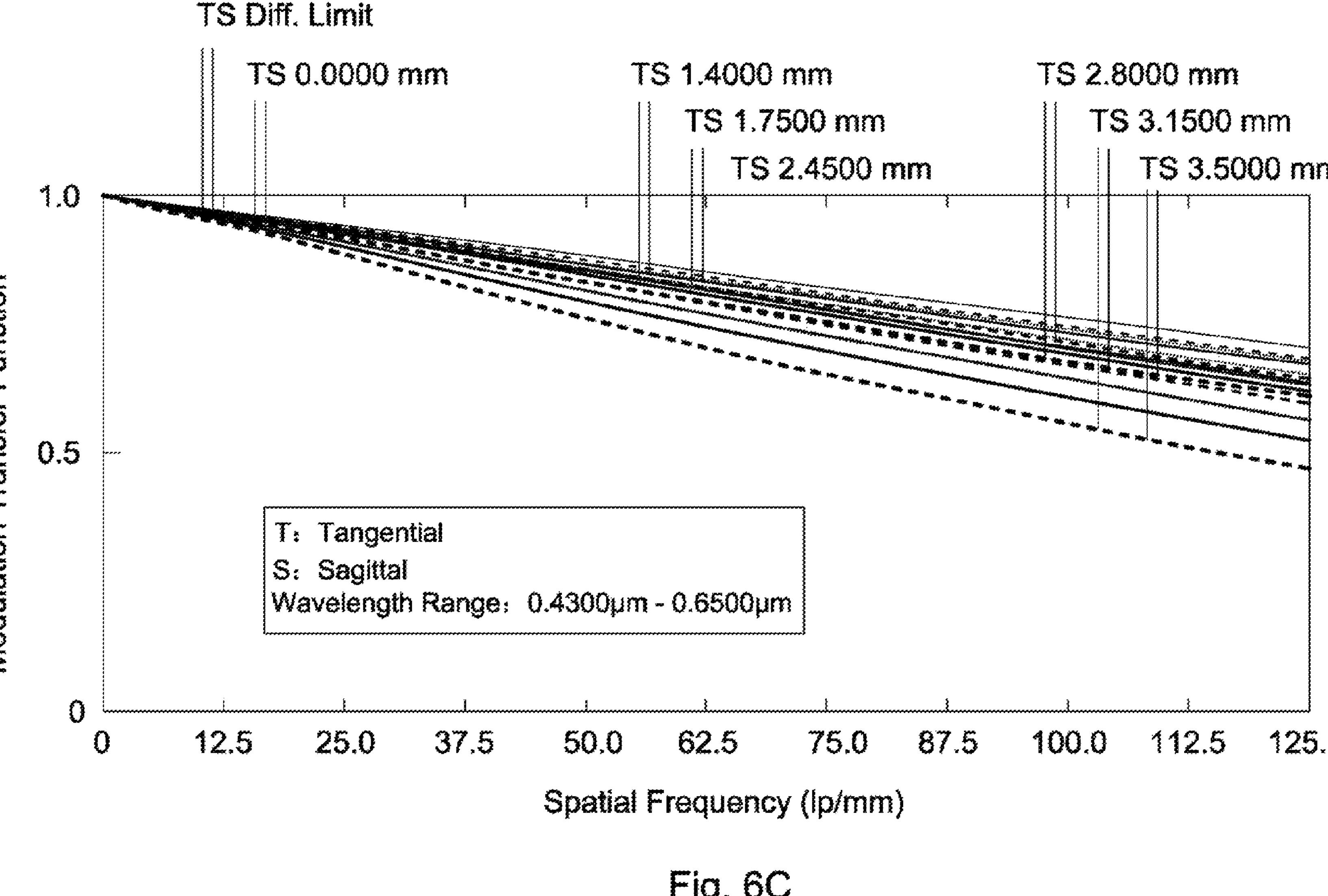

By the above arrangements of the lenses and stop ST3, the lens assembly 3 of the third embodiment can meet the requirements of optical performance. It can be seen from FIG. 6A that the field curvature of tangential direction and sagittal direction in the lens assembly 3 of the third embodiment ranges from −0.2 mm to 0.2 mm. It can be seen from FIG. 6B that the distortion in the lens assembly 3 of the third embodiment ranges from −0.1% to 0.6%. It can be seen from FIG. 6C that the modulation transfer function of tangential direction and sagittal direction in the lens assembly 3 of the third embodiment ranges from 0.47 to 1.0. It is obvious that the field curvature and the distortion of the lens assembly 3 of the third embodiment can be corrected effectively, and the image resolution can meet the requirement. Therefore, the lens assembly 3 of the third embodiment is capable of good optical performance.

Figure 7:
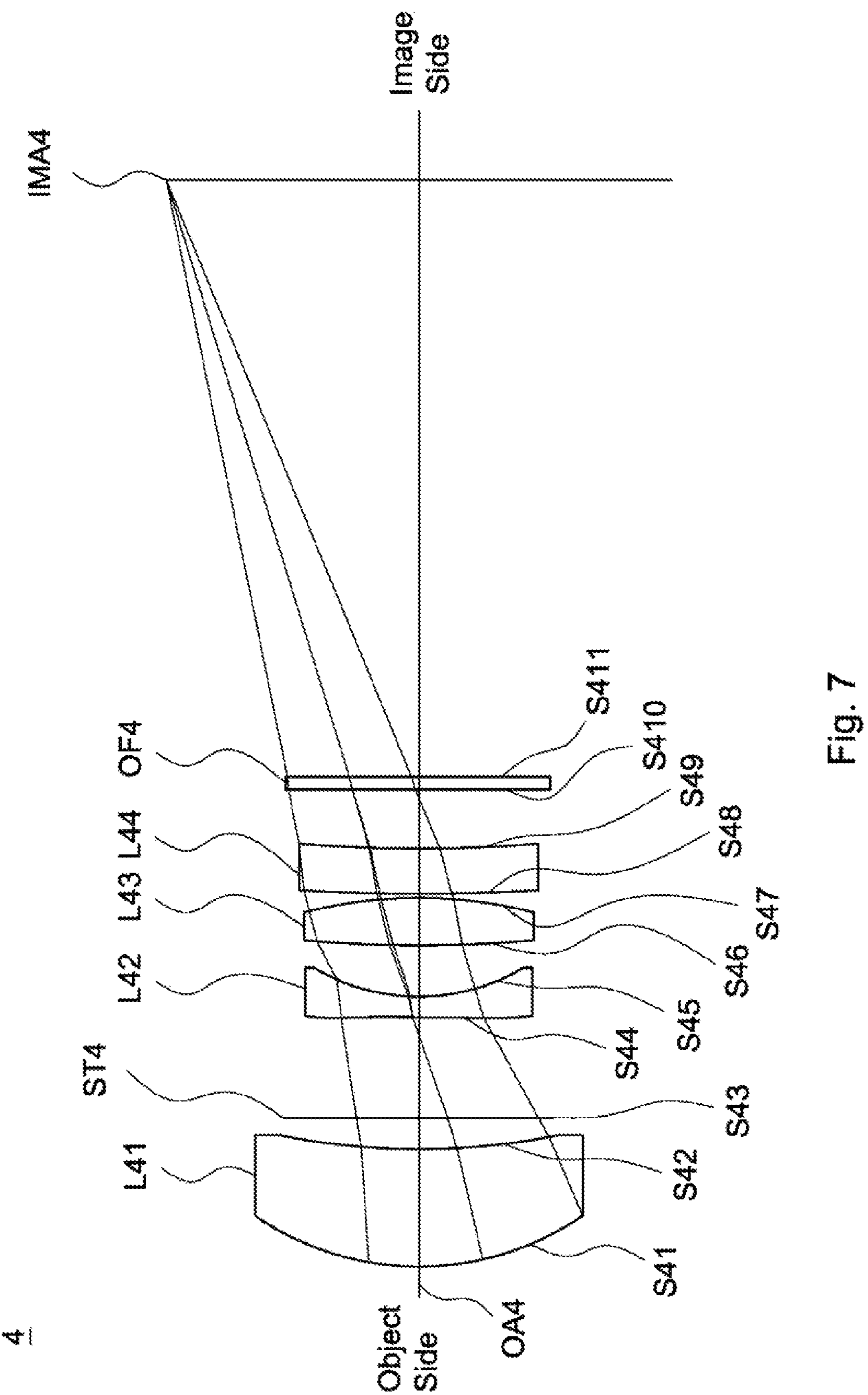
FIG. 7 is a lens layout and optical path diagram of a lens assembly in accordance with a fourth embodiment of the invention.

Referring to FIG. 7, FIG. 7 is a lens layout and optical path diagram of a lens assembly in accordance with a fourth embodiment of the invention. The lens assembly 4 includes a first lens L41, a stop ST4, a second lens L42, a third lens L43, a fourth lens L44, and an optical filter OF4. The first lens L41, the stop ST4, the second lens L42, the third lens L43, the fourth lens L44 and the optical filter OF4 in order from an object side to an image side along an optical axis OA4. In operation, an image of light rays from the object side is formed at an image plane IMA4.

According to the foregoing, wherein: the second lens L42 is a biconcave lens, wherein the object side surface S44 is a concave surface; the fourth lens L44 is meniscus lens with negative refractive power, wherein the object side surface S48 is a convex surface and the image side surface is a concave surface; both of the object side surface S410 and image side surface S411 of the optical filter OF4 are plane surfaces. With the above design of the lenses and stop ST4 and at least any one of the conditions (1)-(2) and (4)-(8) satisfied, the lens assembly 4 can have an effective decreased the total length, an effective increased resolution, an effective corrected aberration, and is capable of an effective corrected chromatic aberration. The preferred embodiment of the present invention can be achieved when the lens assembly satisfies conditions (1)-(2) and (4)-(8), refractive power distribution, and surface shape.

Table 10 shows the optical specification of the lens assembly 4 in FIG. 7.

TABLE 10

Effective Focal Length = 19.004 mm
F-number = 3.5
Total Lens Length = 18.413 mm
Field of View = 24.92 degrees

| Surface Number | Radius of Curvature (mm) | Thickness (mm) | Nd | Vd | Effective Focal Length (mm) | Remark |
|---|---|---|---|---|---|---|
| S41 | 4.862303 | 2.005002 | 1.61882 | 63.9702 | 10.8327 | L41 |
| S42 | 14.91226 | 0.533518 | | | | |
| S43 | ∞ | 1.695911 | | | | ST4 |
| S44 | −39.20089 | 0.356998 | 1.67134 | 19.2429 | −5.5755 | L42 |
| S45 | 4.153289 | 0.8509787 | | | | |
| S46 | 39.84778 | 0.8200016 | 1.66134 | 20.3729 | 9.0794 | L43 |
| S47 | −7.012064 | 0.02987472 | | | | |
| S48 | 9.731521 | 0.7900134 | 1.535218 | 56.11525 | −588.3360 | L44 |
| S49 | 9.172624 | 1 | | | | |
| S410 | ∞ | 0.21 | 1.5168 | 64.1673 | | OF4 |
| S411 | ∞ | 10.12045 | | | | |

The definition of aspheric surface sag z of each aspheric lens in table 10 is the same as that of in Table 1, and is not described here again. In the fourth embodiment, the conic constant k and the aspheric coefficients A, B, C, D, E, F, G, H, I, J, K, L, M of each aspheric surface are shown in Table 11.

TABLE 11

| Surface Number | k<br>E<br>J | A<br>F<br>K | B<br>G<br>L | C<br>H<br>M | D<br>I |
|---|---|---|---|---|---|
| S41 | 5.6502E−02 | −3.1144E−04 | 1.8015E−04 | 3.1911E−05 | −1.1754E−05 |
| | 9.2394E−07 | 1.6729E−06 | −7.1104E−07 | 1.3481E−07 | 4.4131E−08 |
| | 2.7576E−09 | −1.2525E−10 | −4.8723E−11 | 4.6764E−12 | |
| S42 | 2.7193E+01 | −3.6006E−04 | −2.6114E−04 | 1.5364E−04 | −4.6599E−05 |
| | −2.9280E−05 | 9.3770E−07 | −6.2727E−07 | 9.8014E−07 | 1.7668E−07 |
| | 1.7728E−08 | −3.3388E−09 | −4.8516E−10 | 3.8766E−11 | |

TABLE 11-continued

| Surface Number | k<br>E<br>J | A<br>F<br>K | B<br>G<br>L | C<br>H<br>M | D<br>I |
|---|---|---|---|---|---|
| S44 | 4.4808E+01 | 1.3275E−03 | 1.4437E−03 | −5.6809E−04 | 3.3209E−04 |
| | 4.0309E−04 | −2.4793E−04 | 1.1275E−04 | −1.3636E−05 | −3.9089E−06 |
| | 7.5107E−06 | −1.0898E−06 | −2.7394E−07 | 4.7751E−08 | |
| S45 | 1.8511E+00 | 7.2453E−04 | 1.6300E−03 | −6.3170E−04 | 1.1079E−06 |
| | −1.9745E−05 | 7.1495E−05 | 1.3139E−05 | −4.2817E−05 | 8.4233E−06 |
| | 7.1653E−06 | 1.0573E−06 | 1.2241E−07 | −1.3044E−07 | |
| S46 | 2.0832E+02 | 3.4682E−04 | 1.0845E−02 | −9.4297E−04 | −1.1616E−03 |
| | −1.0352E−04 | −1.5378E−04 | 2.5266E−05 | 2.2399E−06 | −3.6479E−05 |
| | 3.6138E−06 | 1.7273E−06 | 6.0232E−07 | −1.3862E−07 | |
| S47 | −3.1197E+01 | −3.1330E−03 | 1.8500E−03 | −2.9123E−03 | −5.8295E−04 |
| | 2.7860E−04 | 2.4518E−04 | −5.0758E−05 | −6.4562E−05 | −8.6034E−06 |
| | 5.3197E−07 | 1.2721E−06 | 2.2354E−07 | −5.4182E−08 | |
| S48 | 2.0083E+01 | −3.9651E−03 | −1.0141E−02 | −4.4530E−03 | −2.6601E−04 |
| | 2.9207E−04 | 2.0502E−04 | 1.7997E−04 | 6.6924E−05 | −3.8734E−05 |
| | 1.7414E−06 | −9.2815E−07 | 9.4106E−07 | −1.5638E−07 | |
| S49 | 2.5184E+00 | 8.9647E−04 | −1.8705E−02 | 1.8684E−03 | 9.4654E−04 |
| | 4.6361E−05 | −5.3598E−06 | 9.5479E−06 | 1.7200E−05 | 2.4068E−07 |
| | −8.4141E−07 | 9.5479E−06 | 1.7200E−05 | 2.4068E−07 | −8.4141E−07 |

Table 12 shows the parameters and condition values for conditions (1)-(2) and (4)-(8) in accordance with the fourth embodiment of the invention. It can be seen from Table 12 that the lens assembly 4 of the fourth embodiment satisfies the conditions (1)-(2) and (4)-(8).

TABLE 12

| | | | | | |
|---|---|---|---|---|---|
| BFL | 11.330 mm | SD1 | 5.480 mm | SD4 | 4.023 mm |
| SL1 | 2.539 mm | SL2 | 15.874 mm | \|f4/BFL\| | 51.925 |
| $R_{11}/R_{42}$ | 0.530 | TTL/SD4 | 4.577 | SD4/SL2 | 0.253 |
| SD4/TTL | 0.219 | SL1/TTL | 0.138 | | |
| SD1/f | 0.288 | | | | |

Figure 8A:
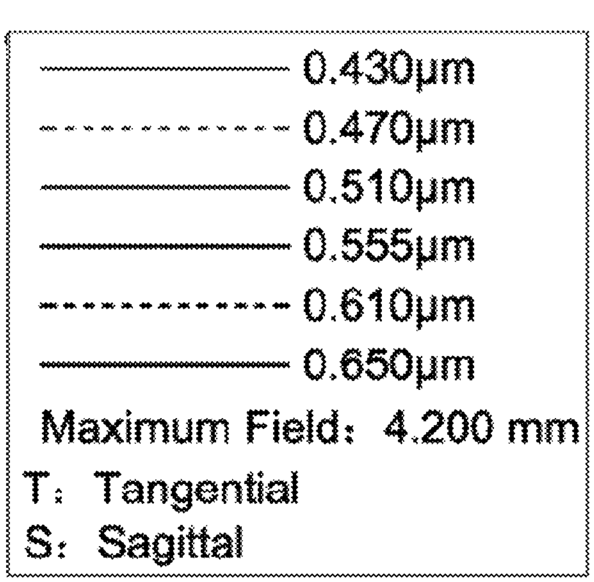
FIG. 8A, FIG. 8B, and FIG. 8C depict a field curvature diagram, a distortion diagram, and a modulation transfer function diagram of the lens assembly in accordance with the fourth embodiment of the invention, respectively.
Figure 8A:
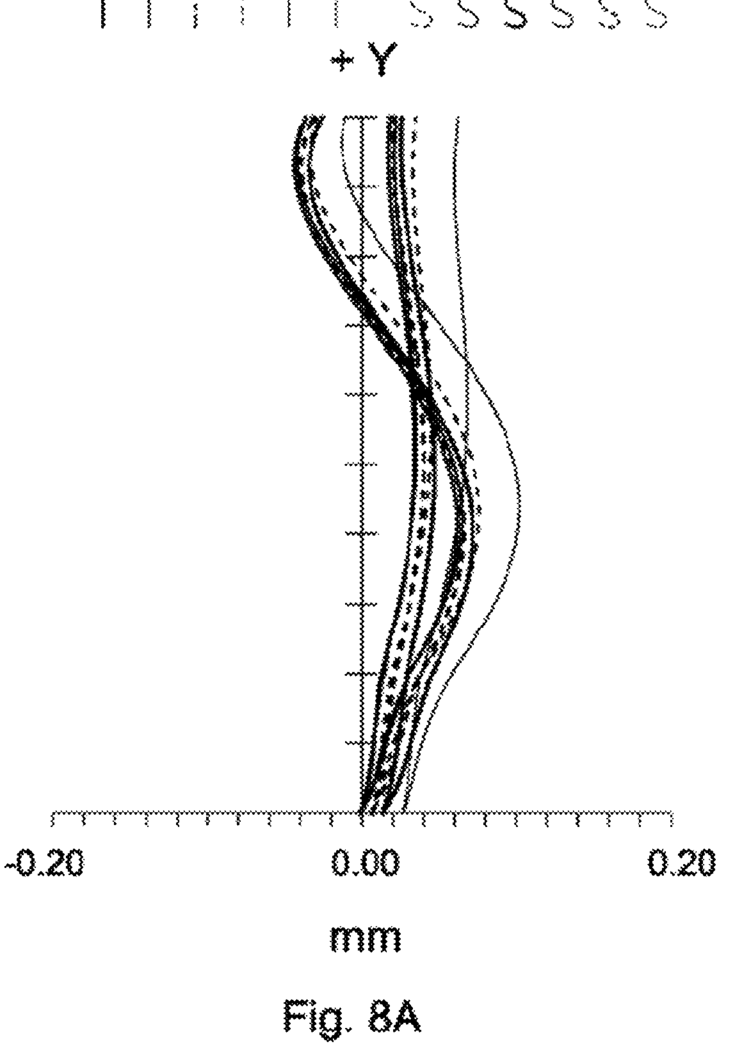
Figure 8B:
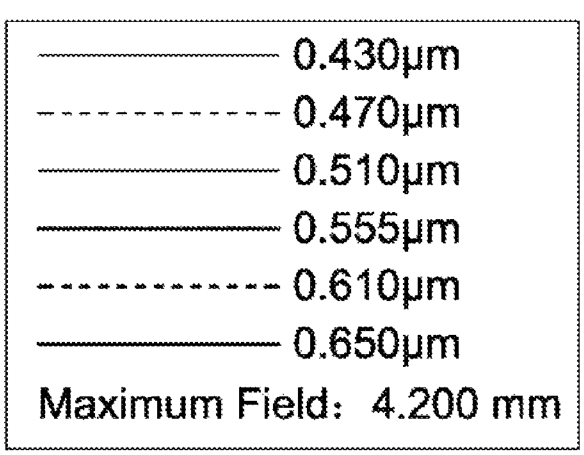
Figure 8B:
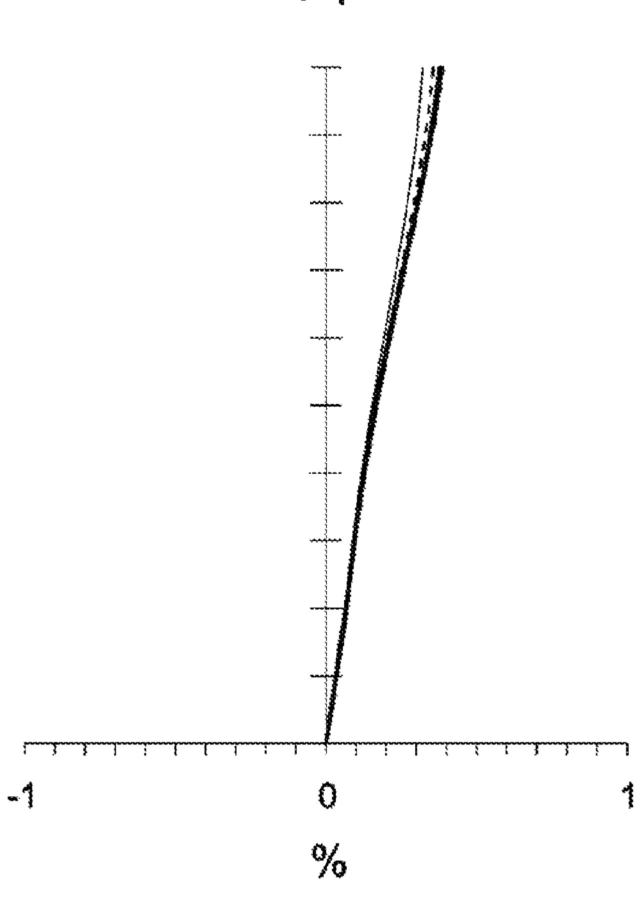
Figure 8C:
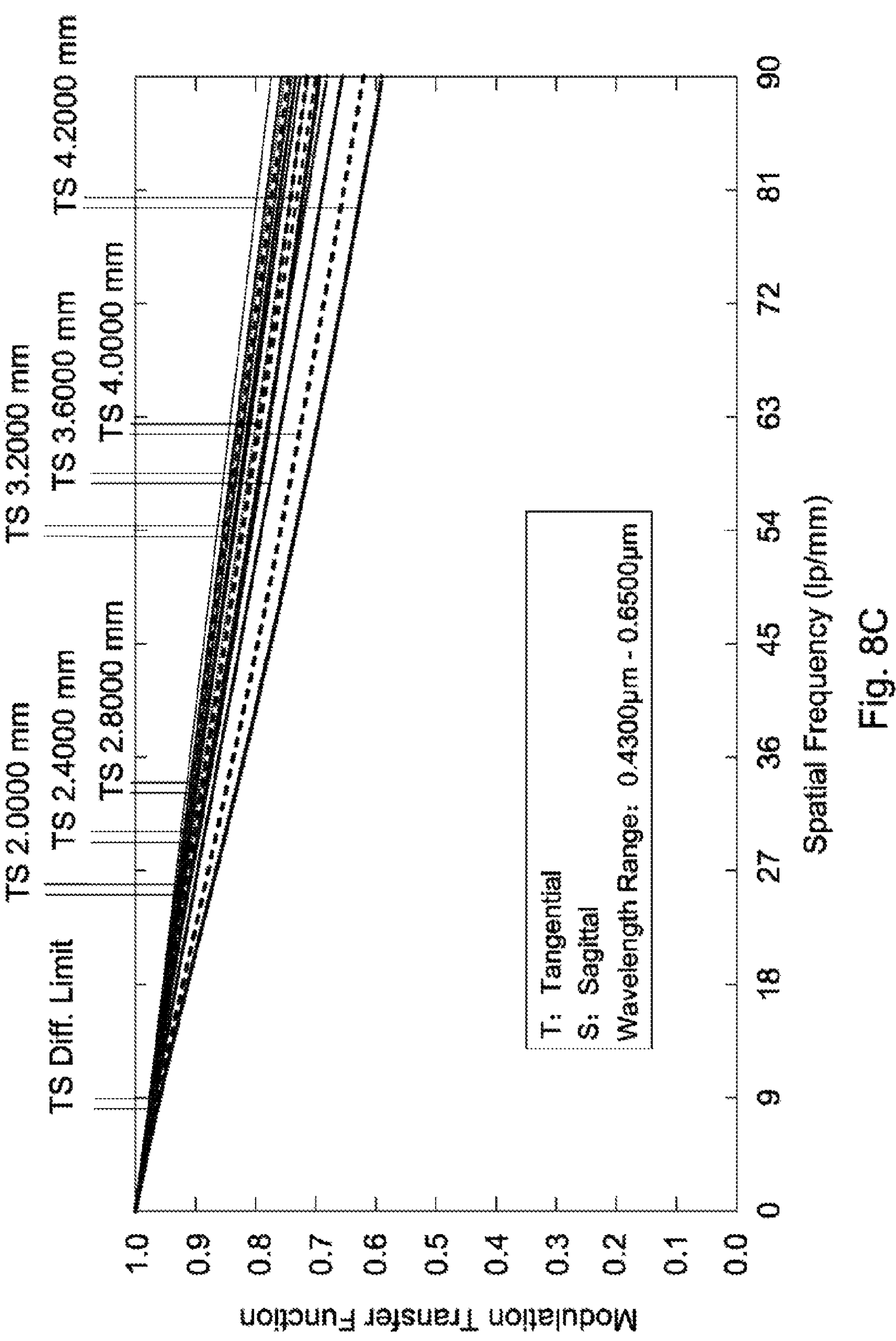

By the above arrangements of the lenses and stop ST4, the lens assembly 4 of the fourth embodiment can meet the requirements of optical performance. It can be seen from FIG. 8A that the field curvature of tangential direction and sagittal direction in the lens assembly 4 of the fourth embodiment ranges from −0.06 mm to 0.1 mm. It can be seen from FIG. 8B that the distortion in the lens assembly 4 of the fourth embodiment ranges from 0% to 0.4%. It can be seen from FIG. 8C that the modulation transfer function of tangential direction and sagittal direction in the lens assembly 4 of the fourth embodiment ranges from 0.59 to 1.0. It is obvious that the field curvature and the distortion of the lens assembly 4 of the fourth embodiment can be corrected effectively, and the image resolution can meet the requirement. Therefore, the lens assembly 4 of the fourth embodiment is capable of good optical performance.

Figure 9:
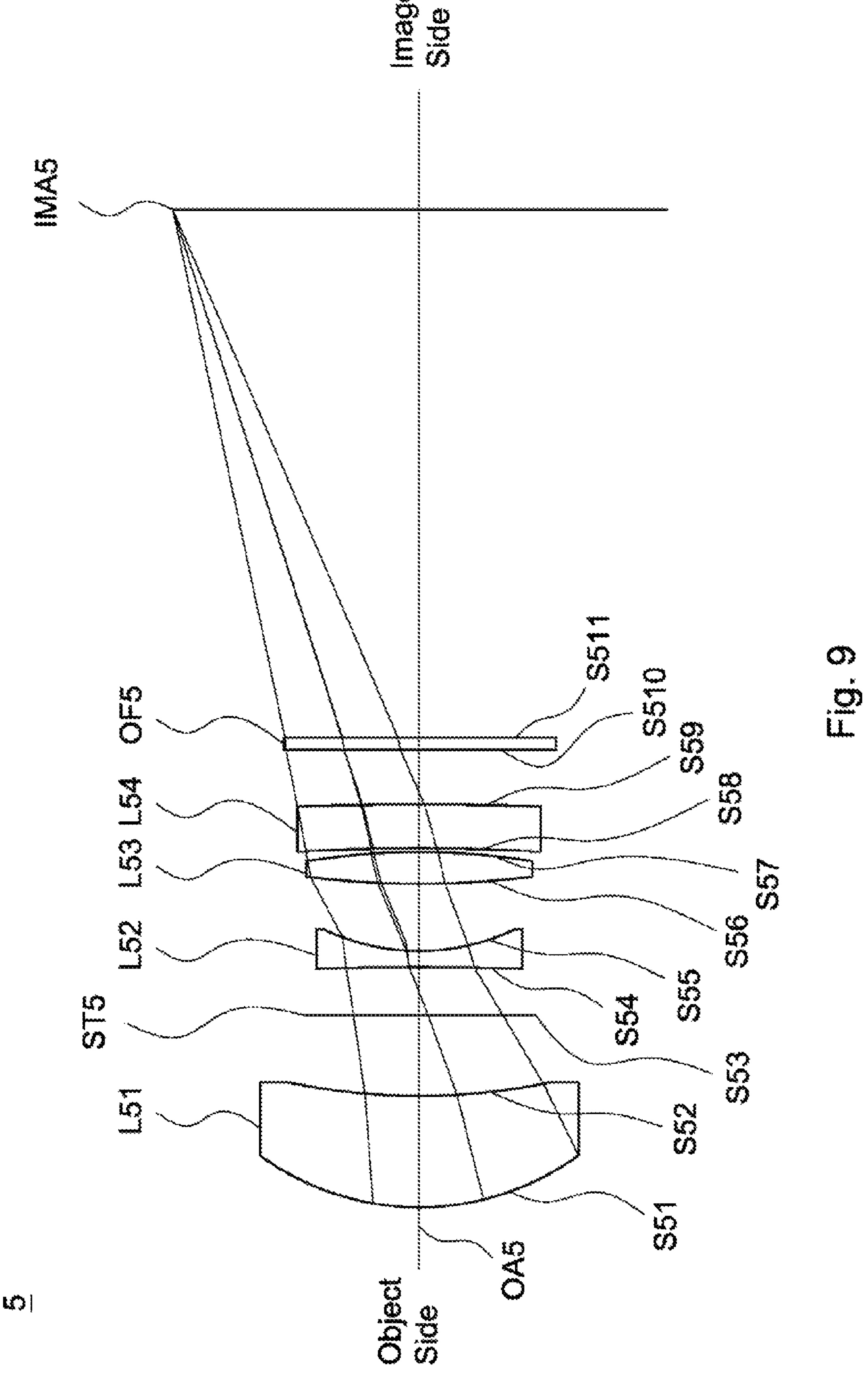
FIG. 9 is a lens layout and optical path diagram of a lens assembly in accordance with a fifth embodiment of the invention.

Referring to FIG. 9, FIG. 9 is a lens layout and optical path diagram of a lens assembly in accordance with a fifth embodiment of the invention. The lens assembly 5 includes a first lens L51, a stop ST5, a second lens L52, a third lens L53, a fourth lens L54, and an optical filter OF5. The first lens L51, the stop ST5, the second lens L52, the third lens L53, the fourth lens L54 and the optical filter OF5 in order from an object side to an image side along an optical axis OA5. In operation, an image of light rays from the object side is formed at an image plane IMA5.

According to the foregoing, wherein: the second lens L52 is a biconcave lens, wherein the object side surface S54 is a concave surface; the fourth lens L54 is meniscus lens with negative refractive power, wherein the object side surface S58 is a convex surface and the image side surface S59 is a concave surface; both of the object side surface S510 and image side surface S511 of the optical filter OF5 are plane surfaces. With the above design of the lenses and stop ST5 and at least any one of the conditions (1)-(2) and (4)-(8) satisfied, the lens assembly 5 can have an effective decreased the total length, an effective increased resolution, an effective corrected aberration, and is capable of an effective corrected chromatic aberration. The preferred embodiment of the present invention can be achieved when the lens assembly satisfies conditions (1)-(2) and (4)-(8), refractive power distribution, and surface shape.

Table 13 shows the optical specification of the lens assembly 5 in FIG. 9.

TABLE 13

Effective Focal Length = 19.004 mm
F-number = 3.5
Total Lens Length = 18.019 mm
Field of View = 24.9 degrees

| Surface Number | Radius of Curvature (mm) | Thickness (mm) | Nd | Vd | Effective Focal Length (mm) | Remark |
|---|---|---|---|---|---|---|
| S51 | 4.658756 | 2.001204 | 1.618821 | 63.9702 | 10.2068 | L51 |
| S52 | 14.83857 | 1.446789 | | | | |
| S53 | ∞ | 0.8847622 | | | | ST5 |
| S54 | −23.66561 | 0.3153428 | 1.671339 | 19.24289 | −5.5372 | L52 |
| S55 | 4.433643 | 1.183656 | | | | |
| S56 | 24.08284 | 0.5896945 | 1.661342 | 20.3729 | 9.5159 | L53 |

TABLE 13-continued

| Effective Focal Length = 19.004 mm<br>F-number = 3.5<br>Total Lens Length = 18.019 mm<br>Field of View = 24.9 degrees | | | | | | |
|---|---|---|---|---|---|---|
| Surface Number | Radius of Curvature (mm) | Thickness (mm) | Nd | Vd | Effective Focal Length (mm) | Remark |
| S57 | −8.436482 | 0.02785689 | | | | |
| S58 | 25.02732 | 0.8035841 | 1.535218 | 56.11525 | −214.5216 | L54 |
| S59 | 20 31824 | 1 | | | | |
| S510 | ∞ | 0.21 | 1.5168 | 64.16734 | | OF5 |
| S511 | ∞ | 9.556519 | | | | |

The definition of aspheric surface sag z of each aspheric lens in table 13 is the same as that of in Table 1, and is not described here again. In the fifth embodiment, the conic constant k and the aspheric coefficients A, B, C, D, E, F, G, H, I, J, K, L, M of each aspheric surface are shown in Table 14.

TABLE 14

| Surface Number | k<br>E<br>J | A<br>F<br>K | B<br>G<br>L | C<br>H<br>M | D<br>I |
|---|---|---|---|---|---|
| S51 | 1.0255E−01 | −2.6780E−04 | 2.9565E−04 | 5.5125E−05 | −1.0145E−05 |
| | 3.0419E−06 | 2.6067E−06 | −4.3341E−07 | 2.8284E−07 | 4.4157E−08 |
| | 7.6556E−10 | −2.8754E−10 | −4.9527E−11 | 9.0773E−12 | |
| S52 | 2.8316E+01 | 1.7060E−04 | −1.4465E−04 | 2.1662E−04 | −3.8711E−06 |
| | −1.9914E−05 | −3.8875E−07 | −1.5330E−06 | 6.0678E−07 | 1.7687E−07 |
| | 2.3899E−08 | −4.5410E−09 | −8.5861E−10 | 1.1735E−10 | |
| S54 | −1.1289E+02 | 4.9341E−04 | 2.5648E−03 | −3.8603E−04 | −3.0295E−05 |
| | −1.4741E−05 | −2.0980E−05 | 1.9537E−05 | 8.5220E−06 | 3.4167E−06 |
| | 1.1768E−06 | −7.3783E−08 | 3.9915E−08 | −2.4403E−08 | |
| | 1.9303E+00 | 7.6798E−04 | 1.6760E−03 | −4.9545E−04 | −9.9088E−06 |
| | −3.9671E−05 | 5.3248E−05 | 1.2455E−06 | −5.0154E−05 | 6.6032E−06 |
| | 6.3450E−06 | 7.6143E−07 | 8.4974E−08 | −1.0523E−07 | |
| S56 | 6.2749E+01 | 9.5873E−04 | 4.0627E−03 | 5.8636E−04 | 6.0669E−06 |
| | −8.6715E−05 | −7.6869E−05 | −4.4395E−05 | −2.0192E−05 | −3.1304E−06 |
| | 2.8350E−07 | 4.4799E−07 | 2.5523E−07 | −3.5680E−08 | |
| S57 | −3.0995E+01 | −7.4940E−04 | 5.2298E−04 | −9.8916E−04 | −3.4566E−04 |
| | −1.3892E−04 | 1.4444E−04 | −4.1720E−09 | −2.1442E−06 | −5.6984E−06 |
| | 5.7758E−07 | 5.9329E−07 | 1.0359E−07 | −2.0627E−08 | |
| S58 | 9.8185E+01 | −2.6131E−03 | −5.9887E−03 | −2.8377E−03 | −7.5943E−04 |
| | 8.7394E−05 | 3.1844E−05 | 7.6035E−05 | 6.3013E−05 | 9.4338E−06 |
| | 7.7322E−07 | −5.6148E−07 | −7.5735E−08 | 5.7612E−09 | |
| S59 | 5.3587E+01 | −3.1248E−03 | −8.5776E−03 | −3.8794E−04 | −1.3506E−04 |
| | 7.1447E−06 | 1.3901E−04 | 3.8886E−09 | 5.4843E−06 | 5.5783E−07 |
| | 1.0728E−07 | 1.4258E−07 | −1.0444E−07 | 1.1266E−08 | |

Table 15 shows the parameters and condition values for conditions (1)-(2) and (4)-(8) in accordance with the fifth embodiment of the invention. It can be seen from Table 15 that the lens assembly 5 of the fifth embodiment satisfies the conditions (1)-(2) and (4)-(8).

TABLE 15

| | | | | | |
|---|---|---|---|---|---|
| BFL | 10.767 mm | SD1 | 5.449 mm | SD4 | 4.180 mm |
| SL1 | 3.448 mm | SL2 | 14.571 mm | \|f4/BFL\| | 19.925 |
| $R_{11}/R_{42}$ | 0.229 | TTL/SD4 | 4.310 | SD4/SL2 | 0.287 |
| SD4/TTL | 0.232 | SL1/TTL | 0.191 | | |
| SD1/f | 0.287 | | | | |

By the above arrangements of the lenses and stop ST5, the lens assembly 5 of the fifth embodiment can meet the requirements of optical performance. The field curvature diagram (figure is omitted), distortion diagram (figure is omitted), and modulation transfer function diagram are similar to those of the lens assembly 4 of the fourth embodiment, and is not described here again. The field curvature and the distortion of the lens assembly 5 of the fifth embodiment can be corrected effectively, and the image resolution can meet the requirement. Therefore, the lens assembly 5 of the fifth embodiment is capable of good optical performance.

Figure 10:
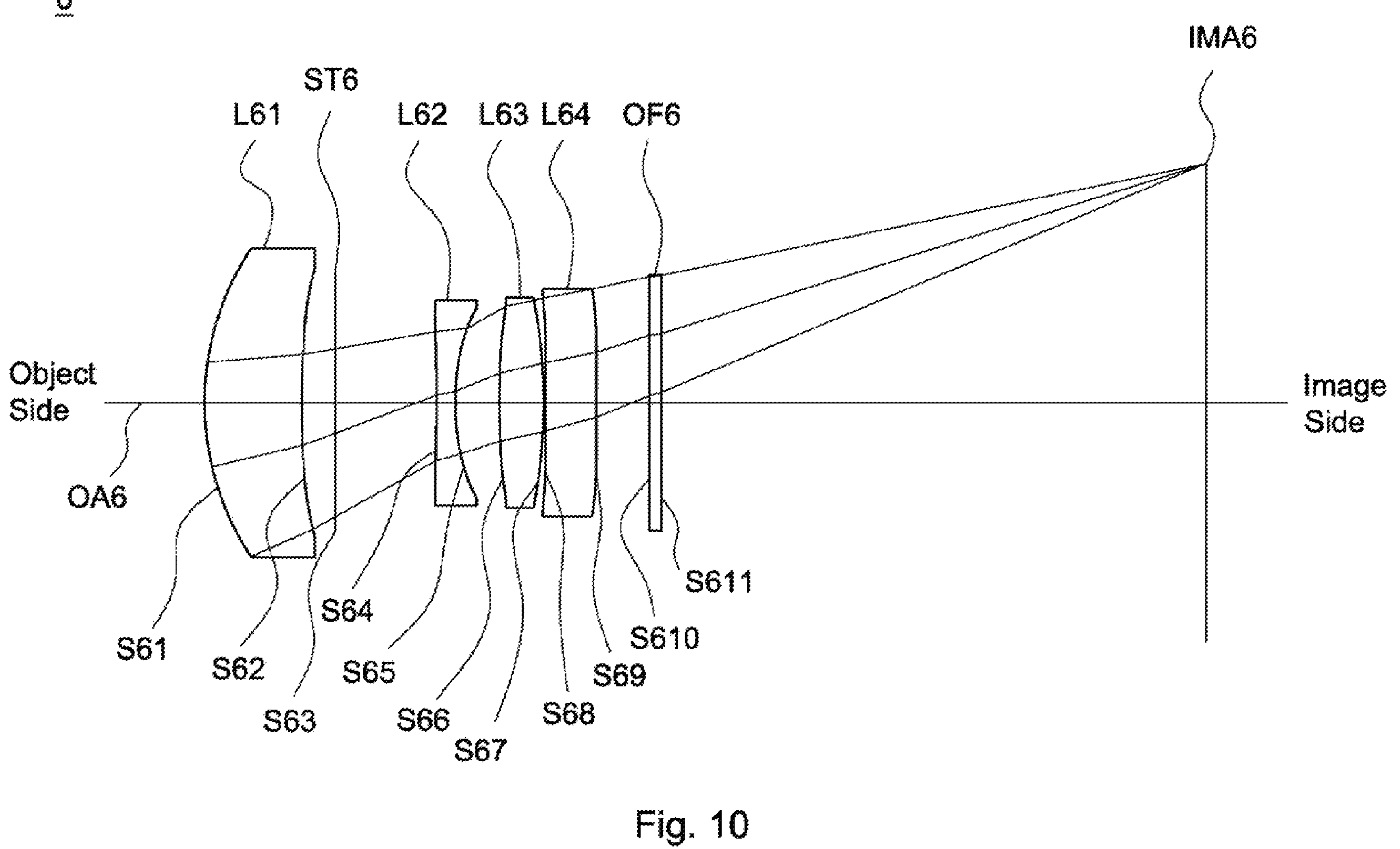
FIG. 10 is a lens layout and optical path diagram of a lens assembly in accordance with a sixth embodiment of the invention.

Referring to FIG. 10, FIG. 10 is a lens layout and optical path diagram of a lens assembly in accordance with a sixth embodiment of the invention. The lens assembly 6 includes a first lens L61, a stop ST6, a second lens L62, a third lens L63, a fourth lens L64, and an optical filter OF6. The first lens L61, the stop ST6, the second lens L62, the third lens L63, the fourth lens L64 and the optical filter OF6 in order from an object side to an image side along an optical axis OA6. In operation, an image of light rays from the object side is formed at an image plane IMA6.

According to the foregoing, wherein: the second lens L62 is a biconcave lens, wherein the object side surface S64 is a concave surface; the fourth lens L64 is meniscus lens with positive refractive power, wherein the object side surface S68 is a convex surface and the image side surface S69 is a concave surface; both of the object side surface S610 and image side surface S611 of the optical filter OF6 are plane surfaces. With the above design of the lenses and stop ST6 and at least any one of the conditions (1)-(2) and (4)-(8) satisfied, the lens assembly 6 can have an effective decreased the total length, an effective increased resolution, an effective corrected aberration, and is capable of an effective corrected chromatic aberration. The preferred embodiment of the present invention can be achieved when the lens assembly satisfies conditions (1)-(2) and (4)-(8), refractive power distribution, and surface shape.

Table 16 shows the optical specification of the lens assembly 6 in FIG. 10.

TABLE 16

Effective Focal Length = 19.004 mm
F-number = 3.5
Total Lens Length = 18.719 mm
Field of View = 24.92 degrees

| Surface Number | Radius of Curvature (mm) | Thickness (mm) | Nd | Vd | Effective Focal Length (mm) | Remark |
|---|---|---|---|---|---|---|
| S61 | 4.930945 | 1.802757 | 1.61882 | 63.9702 | 10.9297 | L61 |
| S62 | 15.65543 | 0.6253327 | | | | |
| S63 | ∞ | 1.905133 | | | | ST6 |
| S64 | −21.67255 | 0.3457092 | 1.67134 | 19.2429 | −5.2665 | L62 |
| S65 | 4.251909 | 0.8250904 | | | | |
| S66 | 17.99141 | 0.8341204 | 1.66134 | 20.3729 | 8.6375 | L63 |
| S67 | −8.215247 | 0.02988168 | | | | |
| S68 | 32.09524 | 0.9483538 | 1.535218 | 56.11525 | 234.8734 | L64 |
| S69 | 42.6551 | 1 | | | | |
| S610 | ∞ | 0.21 | 1.5168 | 64.1673 | | OF6 |
| S611 | ∞ | 10.19215 | | | | |

The definition of aspheric surface sag z of each aspheric lens in table 16 is the same as that of in Table 1, and is not described here again. In the sixth embodiment, the conic constant k and the aspheric coefficients A, B, C, D, E, F, G, H, I, J, K, L, M of each aspheric surface are shown in Table 17.

TABLE 17

| Surface Number | k<br>E<br>J | A<br>F<br>K | B<br>G<br>L | C<br>H<br>M | D<br>I |
|---|---|---|---|---|---|
| S61 | 5.8181E−02 | 9.1428E−05 | 2.0528E−04 | 6.3571E−05 | 3.7852E−06 |
| | 6.8774E−06 | 4.0106E−06 | −4.8515E−07 | 2.1255E−07 | 1.5598E−08 |
| | 1.2623E−09 | 1.7219E−10 | −1.0704E−11 | 2.7090E−12 | |
| S62 | 2.9425E+01 | 3.7300E−04 | −9.3965E−05 | 1.7343E−04 | 8.0017E−06 |
| | −4.0938E−06 | 3.0371E−06 | 3.2751E−07 | 2.0157E−07 | −8.0629E−09 |
| | 7.4967E−09 | 6.1288E−10 | 5.3578E−11 | −6.6780E−12 | |
| S64 | −1.0042E+02 | 5.6685E−04 | 2.6883E−03 | −3.2772E−05 | 5.9894E−05 |
| | 1.4417E−05 | −2.9555E−05 | 1.3302E−05 | 5.7457E−06 | 2.6180E−06 |
| | 5.5104E−07 | −2.1653E−08 | 4.2175E−08 | −1.5305E−08 | |
| S65 | 1.3041E+00 | 1.1673E−03 | 2.0880E−03 | −1.7585E−04 | 7.3861E−05 |
| | −2.1378E−06 | 6.5941E−05 | −2.6561E−06 | −5.8163E−05 | 3.4333E−06 |
| | 5.2013E−06 | 6.1319E−07 | 1.2995E−07 | −5.7323E−08 | |
| S66 | 7.2287E+01 | 8.5506E−04 | 3.7186E−03 | 1.9030E−04 | −1.3171E−04 |
| | −1.0275E−04 | −7.4692E−05 | −4.7238E−05 | −2.0228E−05 | −3.8962E−06 |
| | 6.1189E−08 | 2.2142E−07 | 1.8275E−07 | −1.7209E−08 | |
| S67 | −2.3911E+01 | −1.4762E−03 | 3.7224E−04 | −6.7625E−04 | −2.9035E−04 |
| | −1.4439E−04 | 1.2077E−04 | −4.8328E−06 | −5.1068E−06 | −4.5846E−06 |
| | 6.4126E−07 | 3.2261E−07 | 4.2213E−08 | 6.5788E−11 | |
| S68 | 1.7891E+02 | −3.7440E−03 | −5.4739E−03 | −2.5887E−03 | −6.0866E−04 |
| | 1.7134E−04 | 3.0421E−05 | 5.0169E−05 | 4.4813E−05 | 2.7419E−06 |
| | 1.0579E−07 | −1.2582E−07 | 1.0724E−07 | −2.1866E−08 | |
| S69 | 1.0361E+02 | −2.3090E−03 | −7.9231E−03 | −1.9599E−04 | −1.2056E−04 |
| | 6.9505E−06 | 1.2609E−04 | −6.7574E−06 | 4.0361E−06 | −6.9351E−07 |
| | 7.6363E−08 | 1.7736E−07 | −7.1158E−08 | 7.4292E−09 | |

Table 18 shows the parameters and condition values for conditions (1)-(2) and (4)-(8) in accordance with the sixth embodiment of the invention. It can be seen from Table 18 that the lens assembly 6 of the sixth embodiment satisfies the conditions (1)-(2) and (4)-(8).

TABLE 18

| | | | | | |
|---|---|---|---|---|---|
| BFL | 11.402 mm | SD1 | 5.420 mm | SD4 | 4.000 mm |
| SL1 | 2.428 mm | SL2 | 16.290 mm | \|f4/BFL\| | 20.599 |
| $R_{11}/R_{42}$ | 0.116 | TTL/SD4 | 4.680 | SD4/SL2 | 0.246 |
| SD4/TTL | 0.214 | SL1/TTL | 0.130 | | |
| SD1/f | 0.285 | | | | |

The field curvature diagram (figure is omitted), distortion diagram (figure is omitted), and modulation transfer function diagram are similar to those of the lens assembly 4 of the fourth embodiment, and is not described here again. The field curvature and the distortion of the lens assembly 6 of the sixth embodiment can be corrected effectively, and the image resolution can meet the requirement. Therefore, the lens assembly 6 of the sixth embodiment is capable of good optical performance.

Figure 11:
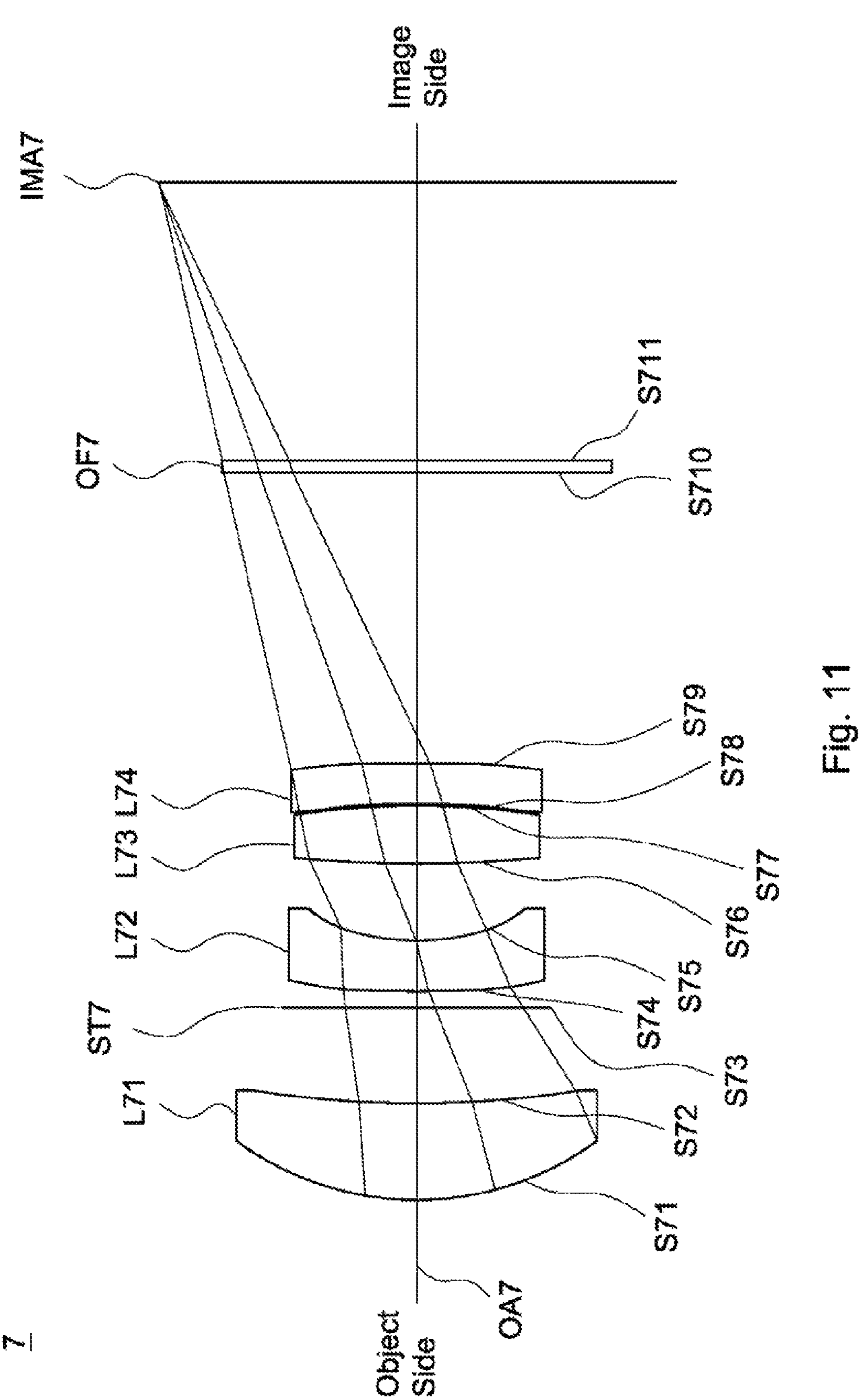
FIG. 11 is a lens layout and optical path diagram of a lens assembly in accordance with a seventh embodiment of the invention.

Referring to FIG. 11, FIG. 11 is a lens layout and optical path diagram of a lens assembly in accordance with a seventh embodiment of the invention. The lens assembly 7 includes a first lens L71, a stop ST7, a second lens L72, a third lens L73, a fourth lens L74, and an optical filter OF7. The first lens L71, the stop ST7, the second lens L72, the third lens L73, the fourth lens L74 and the optical filter OF7 in order from an object side to an image side along an optical axis OA7. In operation, an image of light rays from the object side is formed at an image plane IMA7.

According to the foregoing, wherein: the second lens L72 is a meniscus lens, wherein the object side surface S74 is a convex surface; the fourth lens L74 is meniscus lens with negative refractive power, wherein the object side surface S78 is a concave surface and the image side surface S79 is a convex surface; both of the object side surface S710 and image side surface S711 of the optical filter OF7 are plane surfaces. With the above design of the lenses and stop ST7 and at least any one of the conditions (1)-(7) satisfied, the lens assembly 7 can have an effective decreased the total length, an effective increased resolution, an effective corrected aberration, and is capable of an effective corrected chromatic aberration. The preferred embodiment of the present invention can be achieved when the lens assembly satisfies conditions (1)-(7), refractive power distribution, and surface shape.

Table 19 shows the optical specification of the lens assembly 7 in FIG. 11.

TABLE 19

Effective Focal Length = 19.000 mm
F-number = 3.26
Total Lens Length = 17.491 mm
Field of View = 24.92 degrees

| Surface Number | Radius of Curvature (mm) | Thickness (mm) | Nd | Vd | Effective Focal Length (mm) | Remark |
|---|---|---|---|---|---|---|
| S71 | 4.603334 | 1.665403 | 1.61882 | 63.97 | 9.5887 | L71 |
| S72 | 17.6924 | 1.634952 | | | | |
| S73 | ∞ | 0.2878805 | | | | ST7 |
| S74 | 28.51346 | 0.8724314 | 1.67134 | 19.2429 | −7.2576 | L72 |
| S75 | 4.110099 | 1.325426 | | | | |
| S76 | 29.54656 | 0.9937444 | 1.66134 | 20.3729 | 12.1832 | L73 |
| S77 | −10.93001 | 0.03102059 | | | | |
| S78 | −18.28981 | 0.6914978 | 1.535218 | 56.11525 | −35.6119 | L74 |
| S79 | −458.5162 | 5 | | | | |
| S710 | ∞ | 0.21 | 1.5168 | 64.1673 | | OF7 |
| S711 | ∞ | 4.778369 | | | | |

The definition of aspheric surface sag z of each aspheric lens in table 19 is the same as that of in Table 1, and is not described here again. In the seventh embodiment, the conic constant k and the aspheric coefficients A, B, C, D, E, F, G, H, I, J, K, L, M of each aspheric surface are shown in Table 20.

TABLE 20

| Surface Number | k<br>E<br>J | A<br>F<br>K | B<br>G<br>L | C<br>H<br>M | D<br>I |
|---|---|---|---|---|---|
| S71 | −3.9466E−02 | −1.5617E−04 | 4.8547E−05 | 1.1216E−05 | −2.2263E−05 |
| | −5.3052E−07 | 2.3208E−06 | −6.8696E−08 | 5.7059E−08 | −2.9175E−09 |
| | −9.7170E−11 | −7.5715E−11 | −1.3791E−12 | 5.0736E−13 | |
| S72 | 3.6942E+00 | 2.8752E−04 | −5.7361E−04 | 2.8270E−05 | −3.9084E−06 |
| | −1.2515E−06 | 1.7173E−06 | −4.4491E−07 | −6.5370E−08 | −1.0027E−08 |
| | −4.3862E−09 | 7.6404E−11 | −7.0025E−12 | 1.2426E−12 | |
| S74 | 8.8810E+00 | 1.7047E−03 | 3.6065E−03 | 5.9940E−04 | 1.7482E−04 |
| | −1.1289E−05 | −6.3916E−05 | −4.2999E−06 | −5.4855E−06 | 1.4946E−06 |
| | 2.5427E−07 | −2.6561E−08 | −9.8753E−09 | 8.9703E−10 | |
| S75 | 4.4143E−01 | 2.0377E−03 | 5.0643E−03 | 4.5812E−04 | 3.9088E−04 |
| | 2.1547E−04 | 1.7013E−04 | 2.7789E−05 | −7.0524E−05 | −1.0736E−05 |
| | 1.2553E−06 | 7.8489E−07 | 5.1094E−07 | −1.3359E−07 | |

TABLE 20-continued

| Surface Number | k / E / J | A / F / K | B / G / L | C / H / M | D / I |
|---|---|---|---|---|---|
| S76 | −3.2588E+00 | 3.7643E−04 | 9.0616E−04 | −1.4999E−04 | 1.4334E−04 |
| | 1.0956E−04 | 3.3362E−05 | −1.3386E−05 | −1.2696E−05 | −3.5547E−06 |
| | −4.3561E−07 | 2.0387E−08 | 8.6874E−08 | −2.0583E−09 | |
| S77 | −1.1169E+01 | −2.8420E−03 | 9.1916E−04 | −4.7952E−04 | −2.0948E−04 |
| | −1.3730E−04 | 1.0766E−04 | 1.3112E−06 | −2.0570E−06 | −4.2451E−06 |
| | −9.8280E−08 | 6.7275E−08 | 3.8943E−08 | 1.2244E−08 | |
| S78 | 0.0000E+00 | −4.5203E−03 | −3.5459E−03 | −6.0157E−04 | 1.1676E−05 |
| | 6.2102E−05 | −6.7696E−05 | 5.3231E−06 | 3.7127E−05 | 6.7016E−06 |
| | 5.2312E−07 | −3.7380E−07 | 3.9420E−11 | 1.8754E−08 | |
| S79 | 0.0000E+00 | −3.8860E−03 | −5.8373E−03 | −1.1122E−04 | −1.9613E−04 |
| | 1.4878E−07 | 1.4336E−04 | 3.4756E−06 | 8.6135E−06 | −2.6390E−06 |
| | −3.1311E−07 | 2.2168E−07 | −1.2683E−08 | −2.1240E−09 | |

Table 21 shows the parameters and condition values for conditions (1)-(7) in accordance with the seventh embodiment of the invention. It can be seen from Table 21 that the lens assembly 7 of the seventh embodiment satisfies the conditions (1)-(7).

TABLE 21

| | | | | | |
|---|---|---|---|---|---|
| BFL | 9.988 mm | SD1 | 9.340 mm | SD4 | 8.426 mm |
| SL1 | 3.300 mm | SL2 | 14.190 mm | f4/BFL | −3.565 |
| $R_{11}/R_{42}$ | −0.010 | TTL/SD4 | 2.076 | SD4/SL2 | 0.594 |
| SD4/TTL | 0.482 | SL1/TTL | 0.189 | | |
| SD1/f | 0.491 | | | | |

The field curvature diagram (figure is omitted), distortion diagram (figure is omitted), and modulation transfer function diagram are similar to those of the lens assembly 4 of the fourth embodiment, and is not described here again. The field curvature and the distortion of the lens assembly 7 of the seventh embodiment can be corrected effectively, and the image resolution can meet the requirement. Therefore, the lens assembly 7 of the seventh embodiment is capable of good optical performance.

In the above embodiments, one glass lens and three plastic lenses are used for thinning, maintaining high resolution, and process processing.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens assembly comprising:

a first lens which is a meniscus lens with positive refractive power and comprises a convex surface facing an object side, and a concave surface facing an image side;

a second lens which is with negative refractive power;

a third lens which is with positive refractive power; and a fourth lens which is a meniscus lens with refractive power;

wherein the first lens, the second lens, the third lens, and the fourth lens are arranged in order from the object side to the image side along an optical axis;

wherein the lens assembly has fixed effective focal length;

wherein the lens assembly satisfies following conditions:

$$19 \le |f4/BFL| \le 52;$$

wherein f4 is an effective focal length in mm of the fourth lens, and BFL is an interval in mm from the image side surface of the fourth lens to an image plane along the optical axis.

2. The lens assembly as claimed in claim 1, wherein the second lens comprises a concave surface facing the image side.

3. The lens assembly as claimed in claim 2, wherein the third lens is a biconvex lens which comprises a convex surface facing the object side and another convex surface facing image side.

4. The lens assembly as claimed in claim 3, wherein the second lens further comprises another concave surface facing the object side.

5. The lens assembly as claimed in claim 4, wherein the fourth lens comprises a convex surface facing the object side and a concave surface facing the image side.

6. The lens assembly as claimed in claim 1, wherein the fourth lens is with positive refractive power.

7. The lens assembly as claimed in claim 1, wherein the fourth lens is with negative refractive power.

8. The lens assembly as claimed in claim 7, wherein the second lens comprises a convex surface facing the object side.

9. The lens assembly as claimed in claim 8, wherein the fourth lens comprises a concave surface facing the object side and a convex surface facing the image side.

10. The lens assembly as claimed in claim 1, wherein the fourth lens comprises a concave surface facing the object side and a convex surface facing the image side while the second lens comprises a convex surface facing the object side, or the fourth lens comprises a convex surface facing the object side and a concave surface facing the image side while the second lens comprises a concave surface facing the object side.

11. The lens assembly as claimed in claim 10, further comprising a stop disposed between the first lens and the second lens.

12. The lens assembly as claimed in claim 1, wherein the lens assembly satisfies:

$$0 \le SD4/TTL \le 0.5;$$

wherein SD4 is an optical effective diameter in mm of the fourth lens and TTL is an interval in mm from the convex surface of the first lens to an image plane along the optical axis.

13. The lens assembly as claimed in claim 12, further comprising a stop disposed between the first lens and the second lens;

wherein the lens assembly satisfies at least one of the following conditions:

$$0.05 \le SL1/TTL \le 0.5;$$

$$0.1 \le SD4/SL2 \le 0.8;$$

$$-0.1 < R_{11}/R_{42} \le 0.53;$$

$$0.1 < SD1/f \le 0.6;$$

wherein TTL is an interval in mm from the convex surface of the first lens to the image plane along the optical axis, SD4 is an optical effective diameter in mm of the fourth lens, SL1 is an interval in mm from the convex surface of the first lens to the stop along the optical axis, SL2 is an interval in mm from the stop to the image plane along the optical axis, $R_{11}$ is a radius of curvature of the convex surface of the first lens, $R_{42}$ is a radius of curvature of the image side surface of the fourth lens, SD1 is an optical effective diameter in mm of the first lens, and f is an effective focal length in mm of the lens assembly.

14. The lens assembly as claimed in claim 1, wherein the lens assembly satisfies:

$$2 \le TTL/SD4 \le 7;$$

wherein TTL is an interval in mm from the convex surface of the first lens to the image plane along the optical axis and SD4 is an optical effective diameter in mm of the fourth lens.

15. A lens assembly consisting of a first lens, a second lens, a third lens, and a fourth lens, wherein:

the first lens is a meniscus lens with positive refractive power and comprises a convex surface facing an object side, and a concave surface facing an image side;

the second lens is with negative refractive power;

the third lens is with positive refractive power; and the fourth lens is a meniscus lens with refractive power;

the first lens, the second lens, the third lens, and the fourth lens are arranged in order from the object side to the image side along an optical axis;

the lens assembly has fixed effective focal length; and the lens assembly satisfies at least one of following conditions:

$$-0.1 \le R_{11}/R_{42} \le 0.53;$$

$$0.1 \le SD1/f \le 0.6;$$

$$-10 \le f4/BFL \le -3;$$

wherein $R_{11}$ is a radius of curvature of the convex surface of the first lens, $R_{42}$ is a radius of curvature of the image side surface of the fourth lens, SD1 is an optical effective diameter in mm of the first lens, f is an effective focal length in mm of the lens assembly, f4 is an effective focal length in mm of the fourth lens, and BFL is an interval in mm from the image side surface of the fourth lens to an image plane along the optical axis.

16. A lens assembly comprising:

a first lens which is a meniscus lens with positive refractive power and comprises a convex surface facing an object side, and a concave surface facing an image side;

a second lens which is with negative refractive power and comprises a convex surface facing the object side;

a third lens which is with positive refractive power; and a fourth lens which is a meniscus lens with negative refractive power and comprises a concave surface facing the object side and a convex surface facing the image side;

wherein the first lens, the second lens, the third lens, and the fourth lens are arranged in order from the object side to the image side along an optical axis;

wherein the lens assembly has fixed effective focal length;

wherein the fourth lens comprises a concave surface facing the object side and a convex surface facing the image side while the second lens comprises a convex surface facing the object side, or the fourth lens comprises a convex surface facing the object side and a concave surface facing the image side while the second lens comprises a concave surface facing the object side;

wherein the lens assembly satisfies at least one of following conditions:

$$0.1 \le SD1/f \le 0.6;$$

wherein SD1 is an optical effective diameter in mm of the first lens and f is an effective focal length in mm of the lens assembly.

17. The lens assembly as claimed in claim 16, wherein the lens assembly satisfies at least one of following conditions:

$$-0.1 \le R_{11}/R_{42} \le 0.53;$$

$$2 \le TTL/SD4 \le 7;$$

$$-10 \le f4/BFL \le -3;$$

$$0 \le SD4/TTL \le 0.5;$$

$$19 \le |f4/BFL| \le 52;$$

wherein $R_{11}$ is a radius of curvature of the convex surface of the first lens, $R_{42}$ is a radius of curvature of the image side surface of the fourth lens, TTL is an interval in mm from the convex surface of the first lens to an image plane along the optical axis, SD4 is an optical effective diameter in mm of the fourth lens, $f_4$ is an effective focal length in mm of the fourth lens, BFL is an interval in mm from the image side surface of the fourth lens to an image plane along the optical axis, and f is an effective focal length in mm of the lens assembly.

18. The lens assembly as claimed in claim 17, further comprising a stop disposed between the first lens and the second lens;

wherein the lens assembly satisfies at least one of the following conditions:

$$0.05 \le SL1/TTL \le 0.5;$$

$$0.1 \le SD4/SL2 \le 0.8;$$

wherein TTL is an interval in mm from the convex surface of the first lens to an image plane along the optical axis, SD4 is an optical effective diameter in mm of the fourth lens, SL1 is an interval in mm from the convex surface of the first lens to the stop along the optical axis, and SL2 is an interval in mm from the stop to the image plane along the optical axis.

19. The lens assembly as claimed in claim 16, wherein the second lens comprises a concave surface facing the image side; and the third lens is a biconvex lens which comprises a convex surface facing the object side and another convex surface facing image side.

* * * * *